(12) United States Patent
Spears et al.

(10) Patent No.: US 9,267,570 B2
(45) Date of Patent: Feb. 23, 2016

(54) ADVANCED FLYWHEEL HUB AND METHOD

(75) Inventors: Ward Spears, Essex, MA (US);
Matthew Polimeno, Tewksbury, MA (US); David C. Ansbigian, Stoneham, MA (US); Richard Hockney, Lynnfield, MA (US)

(73) Assignee: Beacon Power, LLC, Tyngsboro, MA (US)

( * ) Notice: Subject to any disclaimer, the term of this patent is extended or adjusted under 35 U.S.C. 154(b) by 1780 days.

(21) Appl. No.: 12/694,112

(22) Filed: Jan. 26, 2010

(65) Prior Publication Data
US 2010/0206126 A1    Aug. 19, 2010

Related U.S. Application Data

(63) Continuation of application No. 12/181,012, filed on Jul. 28, 2008, now abandoned.

(51) Int. Cl.
*H02K 7/02*    (2006.01)
*F16F 15/305*    (2006.01)

(52) U.S. Cl.
CPC .............. *F16F 15/305* (2013.01); *H02K 7/025* (2013.01); *Y02E 60/16* (2013.01); *Y10T 74/212* (2015.01)

(58) Field of Classification Search
CPC ..... F16F 15/305; F16F 15/3153; F16F 15/30; H02K 7/025; Y02E 60/16; Y10T 74/212
USPC .................... 74/572.1, 572.11, 572.12, 574.4; 29/419.1
See application file for complete search history.

(56) References Cited

U.S. PATENT DOCUMENTS

| | | | |
|---|---|---|---|
| 4,341,001 A | 7/1982 | Swartout | |
| 5,285,699 A * | 2/1994 | Walls et al. | ................. 74/572.12 |
| 5,387,451 A * | 2/1995 | Miller | ........................... 428/66.2 |
| 5,692,414 A * | 12/1997 | Gregoire | .................... 74/572.12 |
| 5,732,603 A | 3/1998 | Swett | |
| 6,014,911 A | 1/2000 | Swett | |
| 6,817,266 B1 | 11/2004 | Brackett | |
| 8,584,552 B2 * | 11/2013 | Gottfried | ................... 74/572.11 |
| 2010/0018344 A1 | 1/2010 | Spears | |
| 2015/0128757 A1* | 5/2015 | Schulz et al. | ................. 74/572.2 |

FOREIGN PATENT DOCUMENTS

KR    10-0644458 B1    11/2006

OTHER PUBLICATIONS

International Preliminary Report on Patentability from PCT/US2010/022255 mailed on Jul. 31, 2012 (6 pages).

* cited by examiner

*Primary Examiner* — Adam D Rogers
(74) *Attorney, Agent, or Firm* — Osha Liang LLP

(57) ABSTRACT

An advanced composite flywheel hub and associated method are described for use in a flywheel rotor assembly that includes a shaft and a rim. The hub includes a shaft engaging portion and a rim engaging portion, and is configured for maintaining engagement with the shaft and the rim during operational rotation of the flywheel rotor assembly. The hub exhibits a bending mode, and includes a first layer having axial fibers for stiffening the hub with respect to the bending mode. The hub can further include a stiffening arrangement for increasing the radial stiffness of the shaft engaging portion.

23 Claims, 8 Drawing Sheets

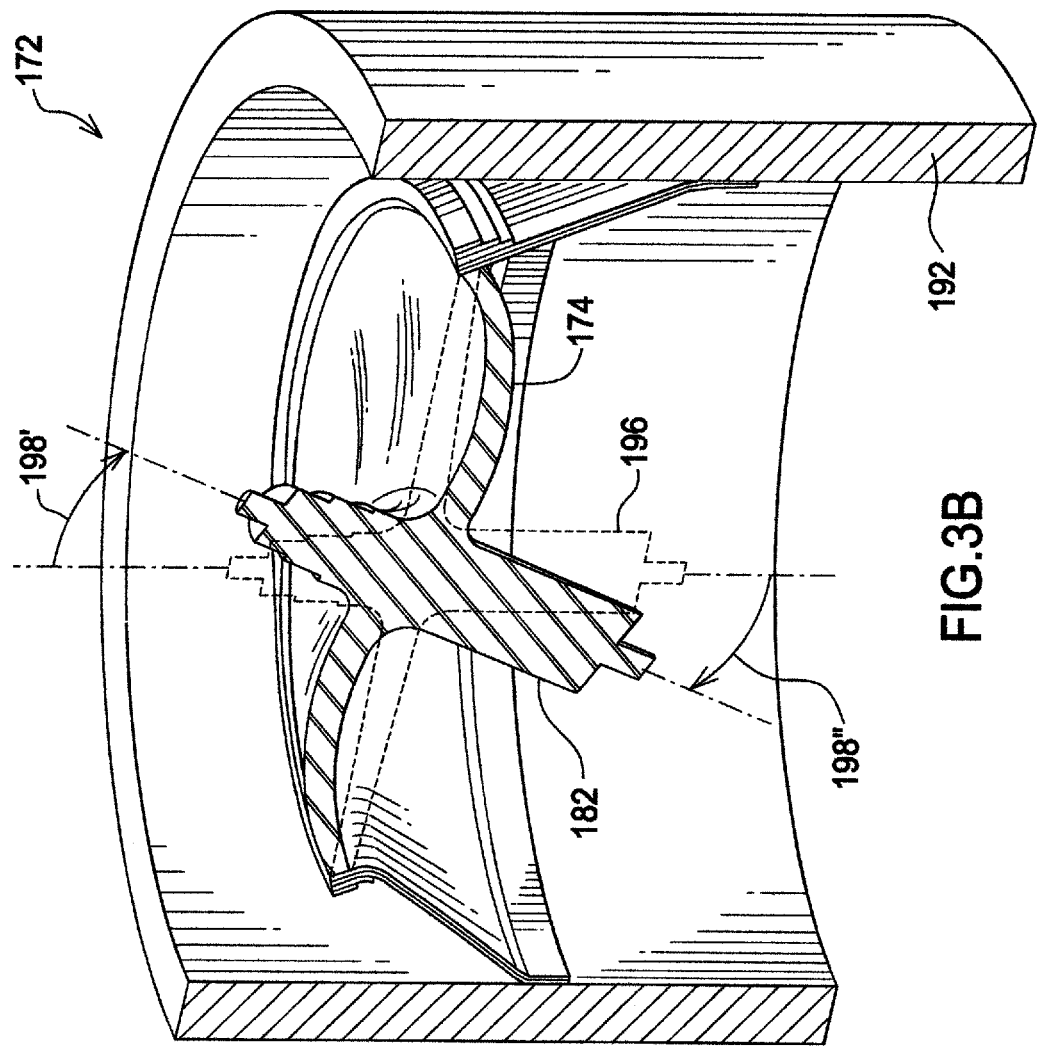

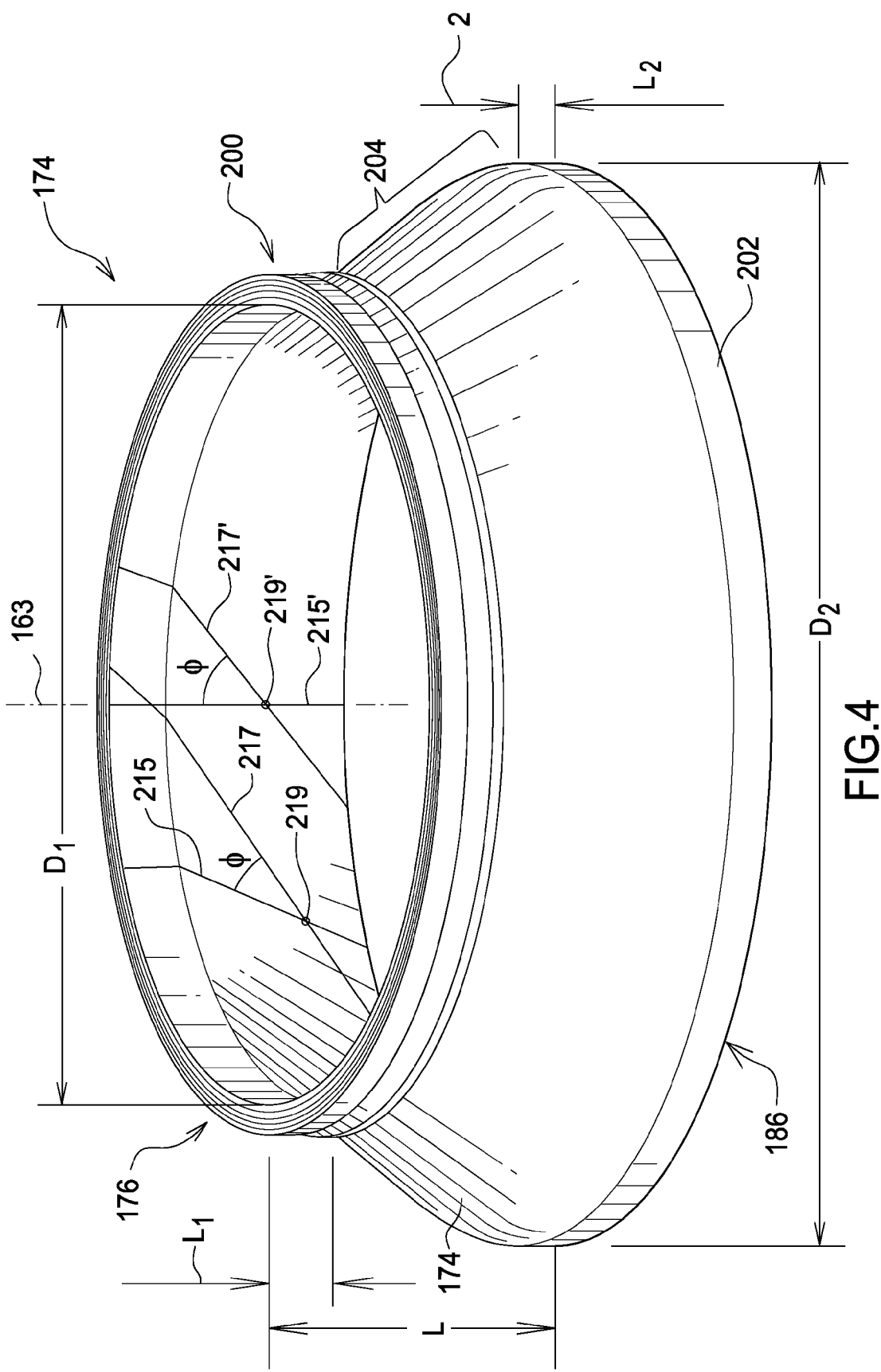

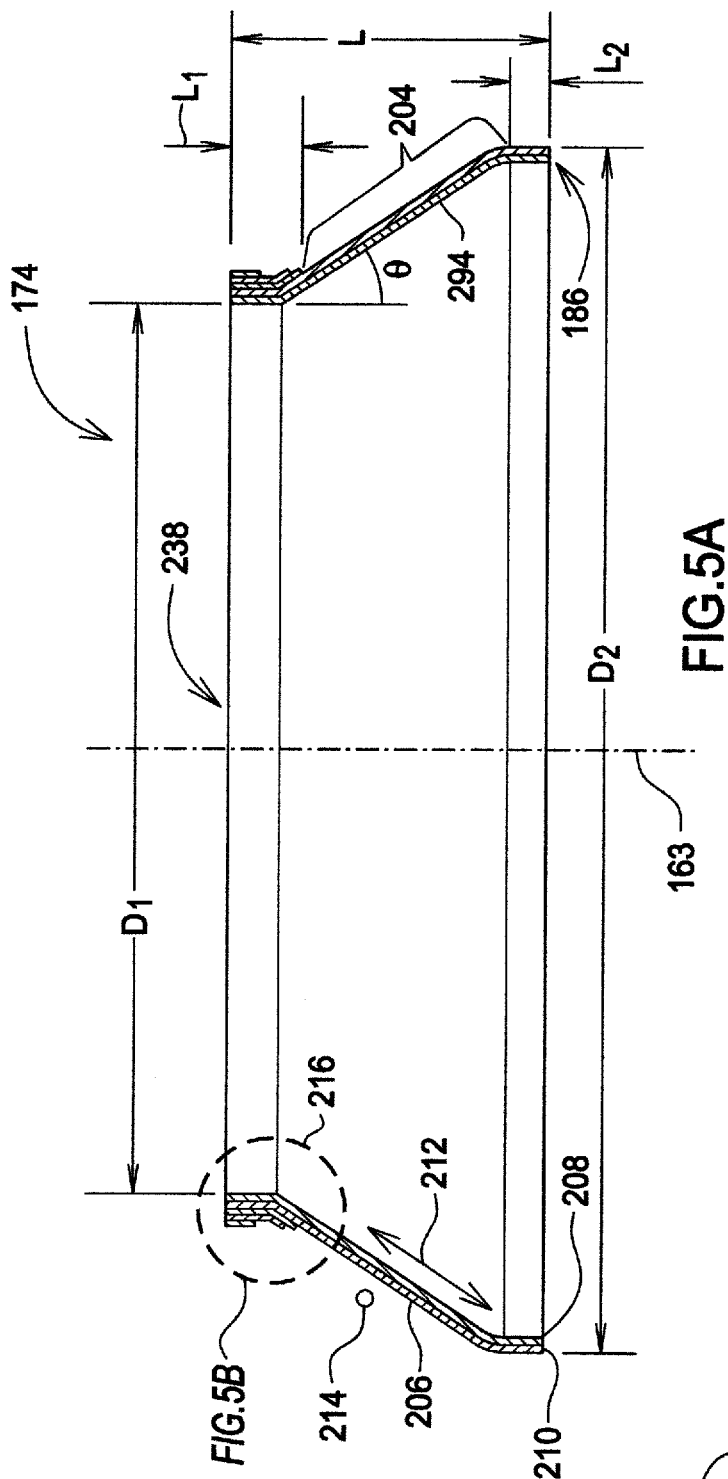
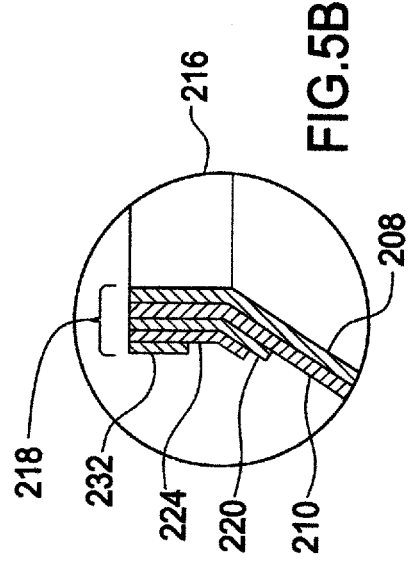

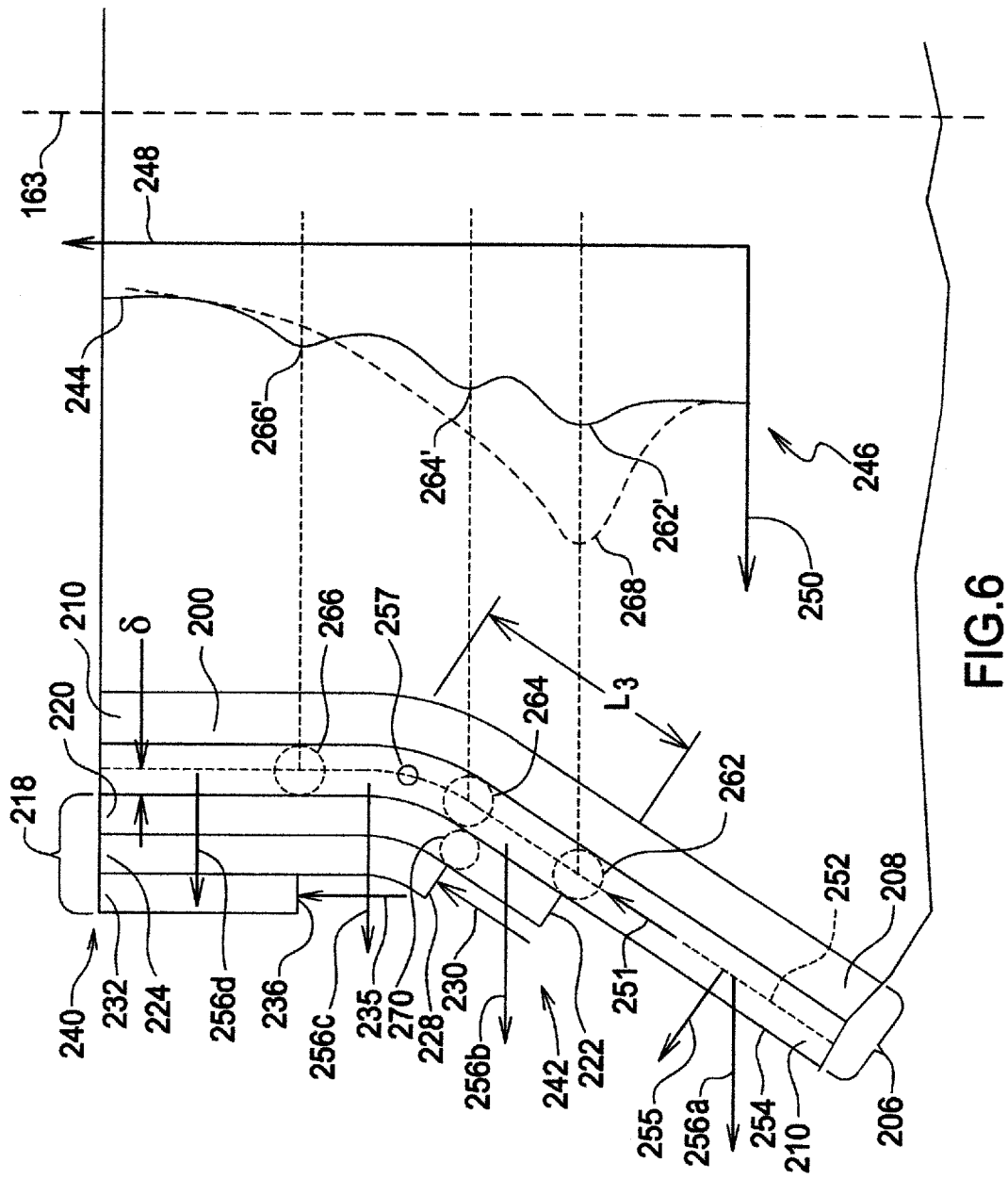

ADVANCED FLYWHEEL HUB AND METHOD

RELATED APPLICATION

The present application is a Continuation-in-Part of U.S. patent application Ser. No. 12/181,012 now abandoned entitled COMPOSITE HUB FOR HIGH ENERGY DENSITY FLYWHEEL, filed on Jul. 28, 2008, which Application is incorporated herein by reference in its entirety.

GOVERNMENT CONTRACT CLAUSE

This invention was made with Government support under contract W31P4Q-04-C-R099 awarded by DARPA and the United States Army. The Government has certain rights in the invention.

BACKGROUND

The present invention is at least generally related to flywheel energy storage systems and, more particularly, to embodiments of an advanced flywheel hub and associated method.

A flywheel may be regarded as a mechanical device, having a significant moment of inertia, that may be used as a storage device for rotational energy. For example, flywheels resist changes in their rotational speed such that an energy input or an energy output is required in order to change the rotational speed of a given rotating flywheel. In predominantly mechanical systems, such as an automobile engine, this requirement may cause the flywheel to exert a stabilizing influence on the system. The same holds for electro-mechanical systems. For example, an electrical motor may include a flywheel for resisting sudden changes in rotational speed of the motor.

In recent decades, high speed flywheels have been employed in electro-mechanical systems that may be configured as electrical storage devices such that the devices can be electrically charged and discharged in a manner that is at least generally analogous to the charging and discharging of conventional rechargeable batteries. In this context, a flywheel can be "charged", for storing energy by using electrical energy provided, for example, through electrical cables to increase the speed of the flywheel to cause an increase in the rotational energy. The flywheel can be subsequently discharged by decreasing the speed to cause a decrease in the rotational energy of the flywheel while converting this rotational energy into electrical energy for delivery, for example through electrical cables, from the flywheel to some external load.

An electrical machine can be attached to a flywheel rotor assembly, for example, using a single shaft, and configured for operating in one of several modes including but not limited to (i) a charging mode with the electrical machine operating as a motor for receiving electrical energy and for increasing the rotational speed of the flywheel, and (ii) a discharging mode with the electrical machine operating as a generator for providing electrical energy via a decrease in the speed of the flywheel and (iii) a float mode with the electrical machine spinning freely without adding or subtracting rotational energy to or from the wheel. It is noted that in the float mode a given flywheel may exhibit residual power losses, for example due to frictional losses, that may cause at least gradual decreases in stored rotational energy even if no electrical power is entering or leaving the flywheel through the electrical machine. For purposes of descriptive clarity, and based on well known conventions, it is noted that an electrical machine attached to a flywheel and configured for operation in one or more of these three modes may be referred to hereinafter as a motor.

It will be readily appreciated by a person of ordinary skill in the art that a maximum energy storage capacity of a flywheel system may depend on a maximum rotational speed at which the flywheel rotor assembly can be rotated, without delaminating or otherwise failing as a result of internal stresses for example due to centrifugal forces, and that an increase in the maximum speed causes a corresponding increase in the maximum storage capacity in proportion to the square of the maximum speed. For example, as will be described hereinafter, the maximum speed of a given flywheel rotor assembly may be determined as the speed at which centrifugal forces cause separation between separate parts of the flywheel rotor assembly. In another example, the maximum speed of a flywheel rotor may be limited by the stiffness of the given flywheel rotor assembly.

It will be further appreciated that the maximum rotational speed can be sufficiently high that the presence of any ambient gas at atmospheric pressure can cause severe power loss and overheating that can result in catastrophic failures. For example, flywheel systems described throughout this disclosure may operate at rotational speeds well above 10,000 rpm. In some applications, a vacuum pressure of less than 10 mTorr is required in order to avoid excessive power loss and rotor heating. In view of these considerations and based on well known techniques, it is often necessary to contain a flywheel in a housing that at least provides an airtight seal for supporting low pressure vacuum surrounding the flywheel rotor.

Turning now to the figures, FIG. 1 is a diagrammatic elevational view, in cross-section, illustrating one example of a prior art electro-mechanical flywheel unit, generally indicated by the reference number 100, that can be utilized for storing rotational energy as part of an electrical energy storage system. Flywheel unit 100 includes a flywheel rotor assembly, generally indicated by reference number 105 having a rotatable shaft 110 that supports a rim 115 using a hub 120 for rotation as indicated by an arrow 122 in a selected direction which can be either clockwise or counterclockwise. The flywheel unit of the present example may be contained in an airtight sealed housing 125 that at least supports low vacuum therein and that provides at least some degree of containment in the event of a high speed failure such as delamination of the rim. Furthermore, flywheel housing 125 may be configured to provide structural support for a number of components therein, as will be described immediately hereinafter.

Flywheel unit 100 includes an electrical motor 126, shown within a dashed rectangle, having a motor rotor assembly 135 that is connected with shaft 110 for co-rotation with the shaft, and a motor stator assembly 140 that is supported by housing 125 through a support structure 145, as needed.

Based on well known techniques, the flywheel rotor may be radially constrained using a lower bearing assembly 150 and an upper bearing assembly 150'. The bearing assemblies can be supported by lower and upper mechanical damper assemblies 155 and 155', respectively, that are connected to housing 125 through support structure 145.

In accordance with well known principles of mechanics, the maximum storage capacity of flywheel unit 100 may depend in part on a moment of inertia the rotor such that a rotor having a higher moment of inertia, with a given maximum speed, may exhibit a proportionally higher storage capacity as compared to a rotor with a lower moment of inertia. Furthermore, it will be appreciated that bearing assemblies capable of operating at high maximum rotational speeds, for example above 15,000 rpm, may be incapable, at least when operating at such high speeds, of withstanding axial forces of more than just a few pounds. In this regard, it is often desirable to configure a given flywheel unit with a flywheel levitation apparatus for limiting axial forces on the bearings by supporting at least a majority of the weight of the rotor in the axial direction using a flywheel levitation apparatus.

Rim 115 may be configured with an inside diameter $D_{RIM}$ and the rim may exhibit a predetermined radial rim stiffness as a resistance to radial expansion, at least with respect to inside diameter $D_{RIM}$, responsive to centrifugal forces caused by operational rotation of the flywheel rotor assembly. Hub 120 may be configured for supporting the rim by engaging the inside diameter thereof such that an outside diameter $D_{HUB}$ expands sufficiently for maintaining contact between the hub and the rim, at least up to and including a maximum speed beyond which the contact between the hub and the rim becomes so tenuous that the hub fails in at least one of (i) supporting the rim, and (ii) transmitting torque between the shaft and the hub. It will be appreciated by a person of ordinary skill in the art, familiar with high speed flywheel energy storage systems, that maintaining engagement, between a flywheel rim and its associated hub, can be highly challenging. Applicants recognize that in many applications, resistance to hub-rim separation is a controlling factor in determining the maximum rotational speed for a given flywheel rotor assembly.

With respect to assembly of a flywheel rotor, it will be appreciated by a person of ordinary skill in the art that at least some amount of rotor imbalance is inevitable, even for precision-balanced flywheel rotor assemblies that have been manufactured according to state-of-the art high precision assembly and/or balancing techniques. For example, a flywheel rotor assembly weighing several hundred pounds, having been assembled based on state-of-the art high precision techniques, may nevertheless exhibit ten gram-inches of imbalance. This imbalance could be caused by a number of well-known phenomena including but not limited to (i) deviations from roundness (out of roundness) wherein a rotationally symmetric component, such as the shaft, exhibits some deviation from roundness, (ii) fluctuations in mass density associated with a given rotor component, such as the rim, and (iii) some degree of misalignment in a given fitting between two rotor components. It is noted that ten gram-inches may be interpreted, according to well known terms of art, as being at least approximately equivalent to the presence of a 1 gram weight at a radial displacement of ten inches from an axis of rotation of the rotor assembly.

Based on standard practice, the imbalance of a given flywheel rotor assembly may be characterized using a precision balancing system, after assembly and prior to installation in a flywheel system, and any measured imbalance may be corrected based on well known balancing techniques. However, it is noted that even utilizing state-of-the art precision balancing, in conjunction with well established rotor balancing techniques, some residual imbalance may remain after assembly and/or during operation. Furthermore, deformations during high speed operation may cause unpredictable imbalances to emerge, for example as dynamic imbalances due to slightly non-uniform rim expansion, despite substantial removal thereof prior to operation.

Based on well known principles of rotor-dynamics, any imbalance in a given flywheel rotor assembly may give rise to upper and lower imbalance forces 164' and 164" that may be exerted by the rotor, through one or both of the bearings, and on the bearing dampers, such that the imbalance force oscillates synchronously with the spinning of the rotor and has a frequency that is equal to a rotational frequency of the flywheel rotor assembly. While reference numbers designated with prime marks are used herein for distinguishing between the upper and lower imbalance forces, reference number 164 may be used hereinafter to refer to imbalance forces collectively in a general sense. It is noted that the upper and lower imbalance forces may be the same or different from one another.

Imbalance forces 164 may cause some degree of transverse motion that may be limited in part by the dampers. It will be appreciated by a person of ordinary skill in the art that in some applications the dampers may be configured to provide an amount of damping that is particularly configured for limiting motion radial motion due to imbalance forces 164. It will be further appreciated by a person of ordinary skill in the art, familiar with rotor dynamics, that unacceptably large radial motions, particularly at very high rotational frequencies above several thousand revolutions per minute (RPM) may lead to complex rotor dynamic motion that may de difficult to characterize and control. For example, for a flywheel rotor weighing several hundred pounds, radial motion substantially exceeding twenty or thirty mils may result in some degree of cross-coupling of rotational energy from the intended rotation of the flywheel about an axis of rotation 163 into undesired twisting motion about a transverse axis of inertia 166 that is oriented cross-wise to axis of rotation 163. One low-speed (and correspondingly low frequency) example of an analogous form of rotor-dynamic cross-coupling may be familiar to anybody who has grasped a fast-spinning bicycle wheel while attempting to twist the axis about a transverse axis thereof. This well known demonstration provides at least some conceptual framework for appreciating how transverse motion of a rotor can, at least in some cases, lead to substantial transverse forces thereon. Insofar as a bicycle wheel is a relatively low speed rotor of relatively light weight, it can be readily appreciated that a heavy rotor (hundreds of pounds) spinning orders of magnitude faster (tens of thousands of RPM) may be susceptible to analogous forces of comparatively extreme magnitude, even in the event of relatively small twisting motions about any transverse axis thereof. At least in light of these considerations, it can be appreciated that for heavy rotors (hundreds or thousands of pounds) rotating at speeds of over 10,000 rpm, limiting the extent of any substantial transverse motions may be required, at least for generally avoiding cross-coupling forces of such severe strength as to be potentially destructive to the flywheel rotor.

It will be yet further appreciated by a person of ordinary skill in the art, familiar with rotor dynamics, that no flywheel rotor can be infinitely rigid with respect to flexure, and that forces due to imbalance may cause vibration of the flywheel rotor, especially in cases where the rotational frequency of operation matches a mechanical resonance of the flywheel rotor. In the latter case, radial forces 164 may cause the rotor to periodically vibrate, in a bending mode, at the frequency of rotation of the flywheel rotor assembly, much as a metal rod may vibrate when struck by a hammer. Vibration of the rotor may cause transverse vibrational motion of at least a portion of the rotor. These transverse vibrational motions may in turn lead to cross-coupling of energy into an inertial axis, such as axis 166, that is not aligned with axis of rotation 163. As described above, even relatively small transverse motions may lead to undesired forces of substantial magnitude, and therefore are to be avoided. Therefore, limiting the extent of rotor vibrations may be required, at least for generally avoiding cross-coupling forces of such severe strength as to be potentially destructive to the flywheel rotor. Furthermore, due to nuances of rotor dynamics, Applicants appreciate that it is often necessary to limit any flexure of the rotor, in the bending mode, to amplitudes that are substantially smaller as compared to acceptable limitations that may be associated with transverse motion of the bearing as dampers.

Attention is now turned to FIG. 2, which is a diagrammatic elevational view, of a flywheel rotor assembly 105, illustrating a fundamental bending mode thereof. Dashed lines 168 indicate an unflexed shape of the rotor prior to any flexure, and solid lines depict the flywheel rotor assembly flexing in a fundamental bending mode. The flexure may take approximately the shape illustrated in FIG. 2, and may have an amplitude 170' at an upper end of the rotor, and an amplitude 170" at a lower end. It is noted that amplitudes 170' and 170" may be the same or different from one another, depending on a number of factors including but not limited to symmetry or asymmetry of the rotor with respect to upper and lower halves thereof, and a distribution of imbalances throughout the rotor. It is considered by Applicants that the relevant descriptions herein at least generally hold with respect to both cases. While reference numbers designated with prime marks have been used to distinguish between the upper and lower amplitudes, reference number 170 may be used hereinafter to refer collectively and in a general sense to the amplitudes of bending modes. It is further noted that the amplitudes are shown as highly exaggerated in the figure for purposes of illustrative clarity.

For any mechanical structure and/or assembly, as will be appreciated by one versed in the theory of mechanical vibration, such a structure may exhibit a plurality of bending modes, any selected one of which may be characterized in part as having an associated bending mode frequency, as a frequency at which the selected mode vibrates. One or more modes in the plurality may have a bending mode frequency that is equal to or lower than the bending mode frequency associated with all the other bending modes. In accordance with standardized nomenclature, the lowest frequency may be referred to as the fundamental frequency such that any mode that tends to vibrate at the fundamental frequency is referred to as the fundamental mode. The mechanical structure may exhibit additional bending modes, of successively higher order and having successively higher bending mode frequencies. In accordance with well established nomenclature, the fundamental bending mode may be interchangeably referred to as a first order mode, and the next successively higher frequency mode may be referred to as a second order mode (not shown in FIG. 2), and so on for additional higher order modes. When these bending modes are regarded as resonant modes, in accordance with well established theories of vibrations, each mode may receive energy from some applied force, such that the amplitude of vibration (for example amplitude 170 in FIG. 2) grows as the received energy increases.

As described above, a rotor imbalance can give rise to radial forces 164. Based on well known principles of mechanics, and in accordance with Newton's third law, this radial force may produce an equal and opposite force (not shown), by the bearing on the rotor. This force is one variety of forces that may cause the flywheel rotor assembly to flex in a motion that can be characterized as some combination of vibrations associated with various ones of the plurality of bending modes, including any fundamental bending mode. Any coupling of energy into each bending mode, for example due to oscillating external and/or internal forces, may depend on the frequency at which the applied force oscillates. In particular, as will be described immediately hereinafter, the fundamental bending mode may exhibit a strong tendency to receive energy from any external forces that are applied to the flywheel rotor at approximately the fundamental bending mode frequency. As the rotational speed slows, the frequency of the applied force correspondingly decreases, and coupling of energy into the fundamental bending mode will generally decrease exponentially. It will be appreciated by a person of ordinary skill in the art that for speeds at which the angular frequency is substantially lower than the fundamental bending mode frequency, any amount of energy coupled into the fundamental bending mode may be sufficiently limited such that amplitude 170 is sufficiently limited. Negative consequences associated with any flexure, in this mode, can be avoided in this way. On the other hand, for high speed operational speeds at which the rotational frequency of the flywheel rotor assembly matches the fundamental bending mode frequency of the flywheel rotor, at least to an approximation, the flywheel rotor may resonantly couple substantial amounts of energy into the fundamental bending mode. Based on complex, yet well established, principles of rotor dynamics, even a relatively small amplitude 170 (for example several mils), of flexure of the rotor, can lead to substantial cross-coupling of energy into rotor axes of inertia (such as axis 166) that are not aligned with the axis of rotation 163. The rotor-dynamics resulting from such transfers of energy can be complex and/or highly unstable, so that the onset of this form of instability can occur rapidly (within a few rotations of the rotor) and may produce destructive forces on and/or within the rotor assembly. At least for this reason, in many applications it is widely held that operation at or near the frequency of the fundamental bending mode frequency is to be completely avoided. At least for these reasons, a given flywheel rotor, having a maximum speed of rotation as described above, may be configured to exhibit a fundamental bending mode having a frequency that substantially exceeds the rotational frequency of the maximum speed of the rotor. For example, one may routinely adhere to a design goal specifying that for a given rotor the fundamental bending mode frequency should exceed the maximum rotational frequency by a substantial margin.

For purposes of enhancing the reader's understanding, coupling of energy into the fundamental bending mode due to radial forces 164 has initially been described. However, it is to be appreciated that energy coupling is not limited in this regard, and that energy may be coupled, from the flywheel rotor assembly, into the fundamental bending mode by a variety of mechanisms. As one well known example, based on well established terms of art, the fundamental bending mode may receive energy in the manner of a self-excited vibration, wherein the energy may couple through complex combinations of mechanisms. Irrespective of the particular manner in which the fundamental mode may receive rotational energy from the flywheel, at least for the reasons described above, Applicants appreciate that it is often advantageous to avoid operation at or near the fundamental bending mode frequency of a given flywheel rotor assembly, at least for a wide variety of rotor assembly configurations.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

Generally, a hub and an associated method are described for use in conjunction with a high-speed flywheel rotor assembly. The rotor assembly includes a shaft that supports the hub which, in turn, supports a rim such that the rotor assembly exhibits at least one predetermined bending mode frequency. In some embodiments, an annular hub body defines an axis of rotation and includes a hub length extending along the axis of rotation from a first end to a second, opposing end. The first defines an inside diameter for engaging an outside diameter of the shaft for co-rotation therewith, and the second end defines an outside diameter for engaging an inside diameter of the rim. The annular elongated hub body is formed in a layered configuration at least including a first, inner layer that includes at least first fibers supported in a first matrix such that the first fibers form at least a majority of fibers that make up the first layer. The first fibers may be limited to one fiber orientation at least generally along the axis of rotation. The hub body may further include a second, outer layer that annularly surrounds the first layer and which includes at least second fibers supported in a second matrix such that the second fibers form at least a majority of fibers that make up the second layer. The second fibers may be limited to another fiber orientation that is transverse to the axis of rotation. The first fibers, oriented along the axis of rotation, increase the predetermined bending mode frequency to a value that is greater than an unmodified value that would otherwise be presented, without the first layer, by stiffening the hub at least with respect to deformations that are associated with the predetermined bending mode.

In more detailed embodiments, the first layer and the second layer exhibit a first radial stiffness and a second radial stiffness, respectively, as a resistance to expansion in the radial direction responsive to the operational rotation. The first and second layers are configured to cooperate with one another so that the hub body exhibits a radial hub body stiffness that varies along the length of the hub body such that the second end of the hub body expands sufficiently, responsive to the operational rotation, for maintaining the engagement with the inside diameter of the rim, at least up to and including a predetermined maximum rotational speed of the rotor assembly. The second fibers are arranged in a hoop orientation such that a first resistance to expansion of the first layer is less than a second resistance to expansion of the second layer, so that the second layer at least radially supports and contains the first layer such that the first layer expands less than it otherwise would without the presence of the second layer during the operational rotation. The first end of the hub body serves as a shaft engaging portion that is configured for engaging the outside diameter of the shaft for co-rotation with the shaft and for forming a first length along the hub length having the inside diameter for engaging the shaft. The second end of the hub body serves as a rim engaging portion having a second length along the hub length configured with the outside diameter for engaging the inside diameter of the rim. The hub body further includes a transition portion extending outward from the shaft engaging portion transverse to the axis of rotation to the hub engaging portion so as to form an intermediate length along the hub length between the first length and the second length. In still more detailed embodiments, the hub includes a stiffening arrangement (i) substantially overlaying the first length of the shaft engaging portion and (ii) a part of the intermediate length of the transition portion nearest the shaft engaging portion to provide an additional radial stiffness at the shaft engaging portion that decreases in a stepwise manner toward the rim engaging portion such that the additional radial stiffness further increases the predetermined bending mode frequency and the shaft engaging portion of the hub body maintains co-rotation with the shaft during an operational rotation of the rotor assembly. The additional radial stiffness provided by the stiffening arrangement enhances the radial stiffness of the shaft engaging portion to a degree that is sufficient to maintain the engagement between the inside diameter of the hub and the outside diameter of the shaft, at least up to and including the predetermined maximum operational rotational speed of the rotor assembly. The hub body at the shaft engaging portion defines a first entrance opening. The stiffening arrangement includes a first stiffening arrangement end nearest the first entrance opening and a second stiffening arrangement end nearest the rim engaging portion and having a stiffening arrangement length therebetween such that the stiffening arrangement induces an additional stress pattern in the hub body responsive to the additional radial stiffness as the hub body biases with centrifugal force against the stiffening arrangement during the operational rotation. The additional stress pattern, starting from the first stiffening arrangement end and extending to the second stiffening arrangement end, exhibits a series of stepwise decreasing values. The stiffening arrangement is an annular layered composite structure having an axial stiffening arrangement length along the axis of rotation that induces an additional stress in the hub body responsive to the operational rotation. The stiffening arrangement includes a first additional layer applied to the hub body to annularly surround the shaft engaging portion and the part of the intermediate length of the transition portion nearest the shaft engaging portion to form the axial stiffening arrangement length along the axis of rotation having a first additional layer edge that faces in a direction that is toward the rim engaging portion. The stiffening arrangement may further comprise at least a second additional layer annularly surrounding at least a portion of the first additional layer having a second additional layer edge facing toward the rim engaging portion with the second additional layer edge inset from the first additional layer edge in an opposing direction that is opposite the rim engaging portion direction. The second additional layer causes a redistribution of the additional stress in the hub body along the axial stiffening arrangement length to compensate for the additional stress. The second additional layer may be configured to reduce an amount of the additional stress in the hub body at the first additional layer edge to a modified stress value that is less than an unmodified stress value that would otherwise be present in the hub body at the first additional layer edge by having the second additional layer axially co-extensive with the first additional layer. The stiffening arrangement may yet further comprise at least a third additional layer annularly surrounding at least a portion of the second additional layer having a third additional layer edge facing in the rim engaging portion direction toward the rim engaging portion such that the third additional layer edge is inset from the second additional layer edge in the opposing direction to further compensate for the additional stress.

In some embodiments of an associated method according to the present disclosure, a hub is produced for use in a high-speed flywheel rotor assembly as part of an overall flywheel system. The rotor assembly includes a shaft that supports the hub which, in turn, supports a rim such that the rotor assembly exhibits a predetermined bending mode frequency. The rim exhibits a radial rim stiffness as a resistance to expansion in a radial direction responsive to centrifugal force induced by an operational rotation of the rotor assembly. The method includes forming an annular elongated hub body at least including a first, inner layer that includes at least first fibers supported in a first matrix with the first fibers forming at least a majority of fibers that make up the first layer. The first fibers are arranged in an orientation that may be limited to one fiber orientation along the axis of rotation. A second layer is provided for annularly surrounding the first layer with a second, outer layer, which second layer includes at least second fibers supported in a second matrix with the second fibers forming at least a majority of fibers that make up the second layer. The second fibers are arranged in an orientation that may be limited to another fiber orientation that is transverse to the axis of rotation such that the hub body is formed to define an axis of rotation and having a hub length extending along the axis of rotation from a first end to a second, opposing end. The hub body defines an inside diameter at the first end for receiving the shaft for co-rotation therewith and an outside diameter at the second end for engaging an inside diameter of the rim. The first fibers are lengthwise oriented along the axis of rotation, for increasing the predetermined bending mode frequency to a value that is greater than an unmodified value that would otherwise be presented without the first layer, by stiffening the hub at least with respect to deformations that are associated with the predetermined bending mode.

In one aspect of the disclosure, embodiments of an improved hub and associated method are described for use in a flywheel system including a rotor assembly. The rotor assembly includes a shaft that supports a hub which, in turn, supports a rim such that the rotor assembly exhibits a predetermined bending mode frequency. The rim exhibits a radial rim stiffness as a resistance to expansion in a radial direction responsive to centrifugal force induced by an operational rotation of the rotor assembly. The hub is configured to include an annular elongated hub body in a layered configuration. The layered configuration includes, as part of an overall hub structure, a material layer that consists of fibers supported in a first matrix having a majority of the fibers limited to a fiber orientation extending along the axis of rotation such that the majority of the fibers increases the predetermined bending mode frequency to a value that is greater than an unmodified value that would otherwise be presented without the first layer by stiffening the hub at least with respect to deformations that are associated with the predetermined bending mode.

BRIEF DESCRIPTIONS OF THE DRAWINGS

Exemplary embodiments are illustrated in referenced figures of the drawings. It is intended that the embodiments and figures disclosed herein are to be illustrative rather than limiting.

FIG. 3B is a diagrammatic cutaway perspective view of the flywheel rotor assembly of FIG. 3A, shown here to illustrate a selected bending mode of the flywheel rotor assembly.

FIG. 4 is a diagrammatic perspective view of one embodiment of a composite hub that can be used as part of the flywheel rotor assembly of FIG. 3A and FIG. 3B, shown here for illustrating further details with respect to its structure.

FIG. 5A is a diagrammatic cross-sectional view, in elevation, of the composite hub of FIG. 4, shown here to illustrate yet further details with respect to its structure.

FIG. 5B is a diagrammatic cross-sectional view, in elevation, of a stiffening arrangement that can be included as part of the embodiment of the composite hub of FIGS. 4 and 5A, shown here in an enlarged view for providing further illustrative detail with respect to this arrangement.

FIG. 6 is a further enlarged diagrammatic cross-sectional view of the stiffening arrangement of FIG. 5B, shown here for illustrating further details with respect to its structure and operation.

DETAILED DESCRIPTION

The following description is presented in order to enable one of ordinary skill in the art to make and use the invention and is provided in the context of a patent application and its requirements. Various modifications to the described embodiments will be readily apparent to those skilled in the art and the generic principles taught herein may be applied to other embodiments. Thus, the present invention is not intended to be limited to the embodiment shown, but is to be accorded the widest scope consistent with the principles and features described herein including modifications and equivalents, as defined within the scope of the appended claims. It is noted that the drawings are not to scale and are diagrammatic in nature in a way that is thought to best illustrate features of interest, for example, by exaggerating the appearance and/or size of features of interest relative to other features. Descriptive terminology such as, for example, upper/lower, vertically/horizontally and the like may be adopted for purposes of enhancing the readers understanding, with respect to the various views provided in the figures, and is in no way intended to be limiting.

Figure 1:
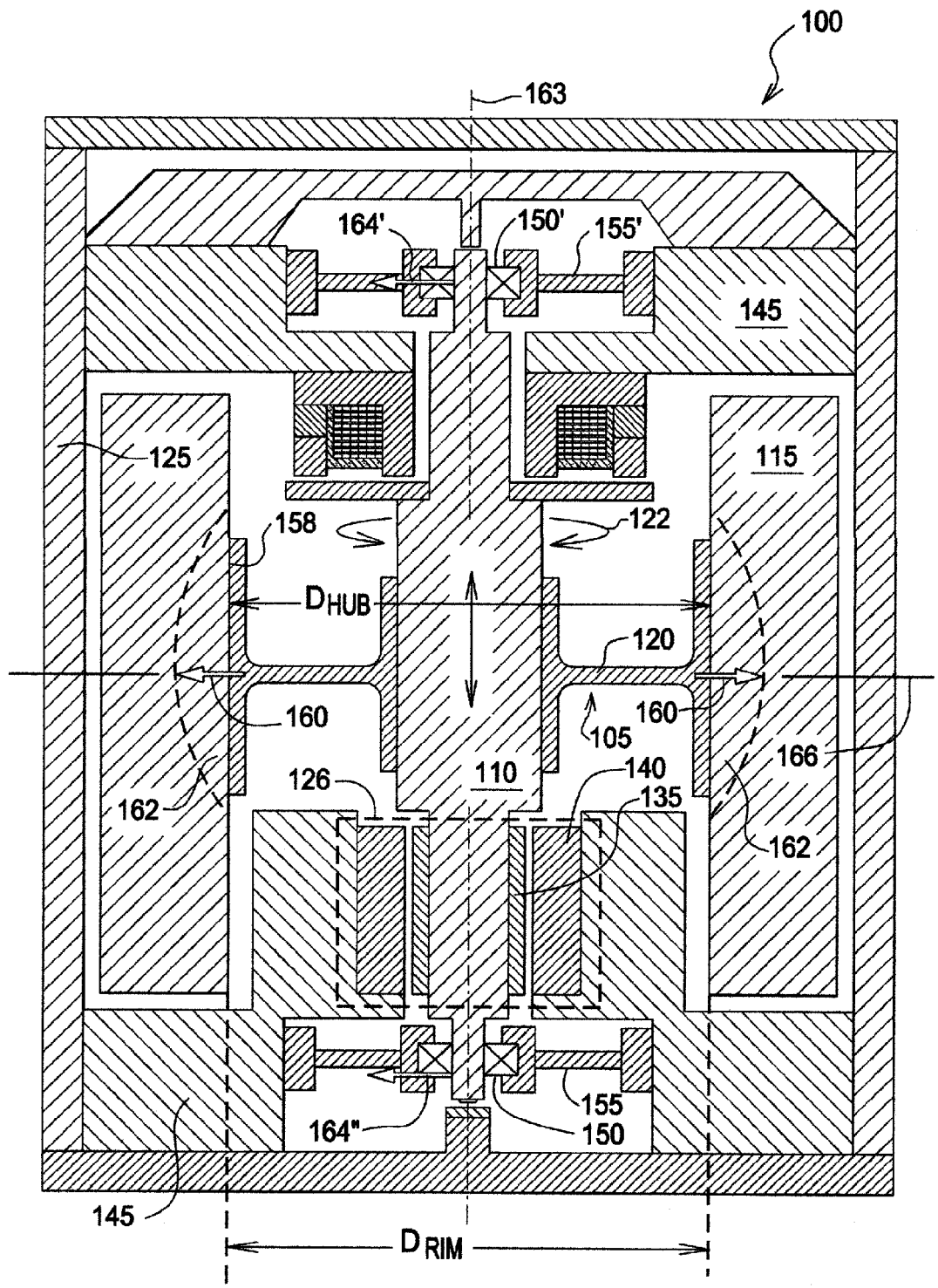
FIG. 1 is a diagrammatic cross-sectional view, in elevation, of a prior art electromechanical flywheel unit, shown here to illustrate various aspects of its structure and operation.
Figure 2:
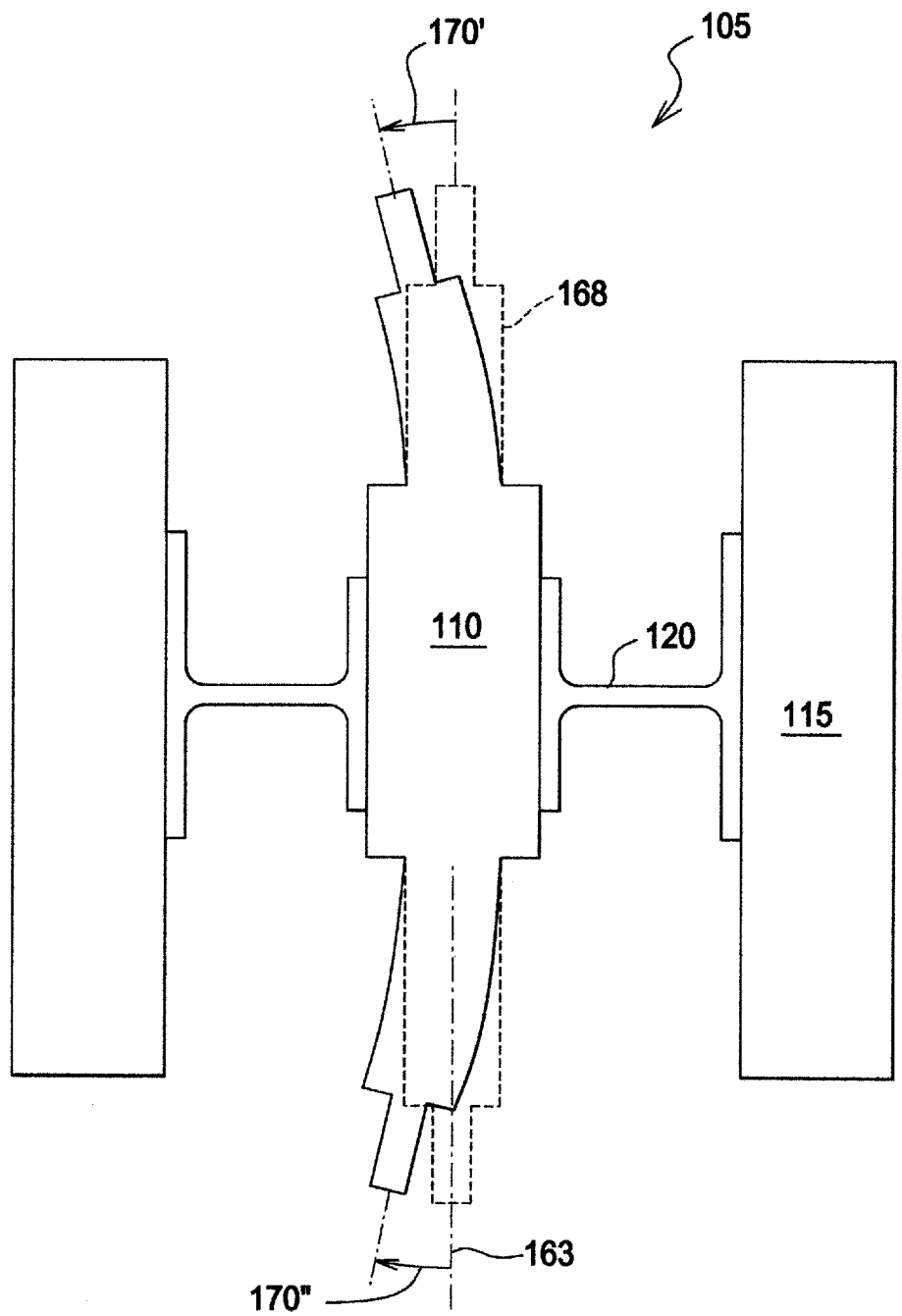
FIG. 2 is a diagrammatic, cross sectional view, in elevation, of a prior art flywheel rotor assembly, shown here to illustrate selected features of its operation, including its fundamental bending mode.
Figure 3A:
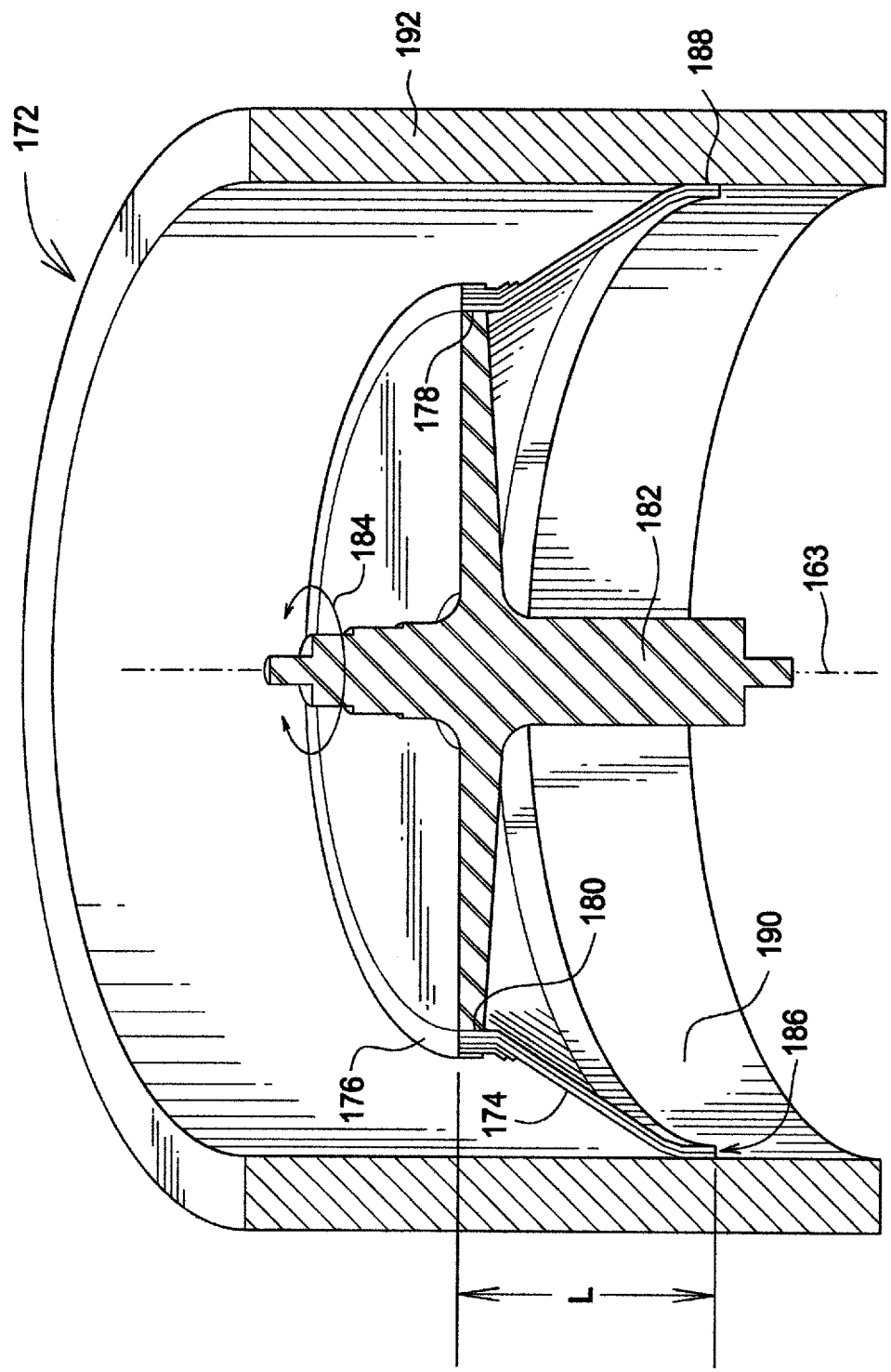
FIG. 3A is a diagrammatic, partially cutaway perspective view of one embodiment of a flywheel rotor assembly including a composite hub that is produced according to the present disclosure.

Attention is now turned to FIG. 3A, which is a diagrammatic cutaway perspective view of a portion of a high speed flywheel rotor assembly, generally indicated by the reference number 172, including a multilayer composite hub 174 defining an axis of rotation 163. Hub 174 includes a first end 176 defining an inside diameter 178 for engaging an outside shaft diameter 180 of a shaft 182 for co-rotation therewith, in a clockwise or counter-clockwise direction 184 as indicated by an arrow. Hub 174 further defines a second end 186, in an opposing direction from the first end, defining an outside diameter 188 for engaging an inside rim diameter 190 of a rim 192. Hub 174 defines a hub length L extending along the axis of rotation. In one or more embodiments that have been brought to light herein, the hub may exhibit a radial hub stiffness that varies along the length of the hub such that the second end of the hub body expands sufficiently, in response to operational rotation of the flywheel rotor assembly, for maintaining engagement with the inside diameter of the rim, at least up to and including a predetermined maximum speed of the rotor assembly. Furthermore, in embodiments that are produced in accordance with the present disclosure, the hub may be configured such that the first end exhibits a sufficiently high radial stiffness, as a resistance to radial expansion in response to operational rotation thereof, for maintaining engagement between inside diameter 178 of the hub and outside diameter 180 of the shaft. Multilayer composite hub 174 may be configured to exhibit a predetermined degree of bending stiffness with respect to a second order bending mode, as will be described immediately hereinafter. While the present description considers the second order, it is equally applicable with respect to any higher order modes that may be of concern.

Attention is now turned to FIG. 3B, which is a diagrammatic cutaway perspective view, in elevation, of flywheel rotor assembly 172, illustrating a second order bending mode thereof. Dashed lines 196 indicate an unflexed shape of the rotor prior to any flexure, and solid lines depict the flywheel rotor assembly flexing in a second order bending mode. The flexure, in the shape of the second order bending mode, has an amplitude 198 that is highly exaggerated in the figure, for purposes of illustrative clarity. It is noted that amplitudes 198' and 198" may be the same or different from one another, depending on a number of factors including but not limited to symmetry or asymmetry of the rotor with respect to upper and lower halves thereof, and a distribution of imbalances throughout the rotor. It is considered by Applicants that the descriptions which follow immediately below at least generally hold with respect to both cases. While reference numbers designated with prime marks have been used to distinguish between the upper and lower amplitudes 198' and 198", reference number 198 may be used hereinafter to refer in a general or collective sense with respect to these amplitudes.

Based on considerations described previously in the context of the fundamental bending mode of a conventional flywheel rotor assembly, hub 174 may be configured to be sufficiently stiff, at least with respect to the second order bending mode, such that the second order bending mode frequency exceeds the frequency of rotation of the maximum speed of the flywheel rotor assembly. However, it is noted that the illustrated embodiment of hub 174 may exhibit a fundamental bending mode frequency that is substantially lower than that of the illustrated second order mode. As will be described in further detail at appropriate points hereinafter, the fundamental bending mode frequency of hub 174 may be sufficiently low so as to lie well below an operating range of rotational frequencies required for a given application. For example, in many flywheel energy storage applications, there may be no requirement for continuous operation below a predetermined lowest rotational frequency of approximately 267 Hz, corresponding to approximately 16000 RPM. In this instance, it may be acceptable for rotor 174 to exhibit a fundamental bending mode frequency at or below 230 HZ, provided that the rotational frequency of the flywheel rotor is never allowed to continuously dwell at or near this frequency. For example, during a start-up mode of operation, as the flywheel starts from zero RPM and is spun up towards 16000 RPM, it may be necessary to accelerate the flywheel's rotational frequency at a rate of rotational acceleration that is sufficient to pass through this resonant frequency without exciting this vibrational mode of the hub. Conversely, during a power-down mode of operation, in which the flywheel may be lowered from 16000 RPM to zero RPM, it may be necessary to decelerate the rotational frequency of the flywheel rotor at a correspondingly sufficient rate. Based on well established nomenclature, any bending modes, of the flywheel rotor assembly, that lie below the operating range, may be regarded as low frequency modes, and bending modes that lie above the operating range may be regarded as high frequency modes. While the foregoing descriptions encompass a flywheel rotor assembly having one low frequency mode, these descriptions are not intended as being limiting in this regard. It is noted that there may be a number of low frequency modes, and that the same general considerations may apply equally to each.

While hub 174 may be configured to be sufficiently stiff, at least with respect to the second order bending mode, such that the second order bending mode frequency exceeds the frequency of rotation of the maximum speed of the flywheel rotor assembly, Applicants appreciate that the hub may be configured to be sufficiently flexible, at least with respect to radial expansion of second end 186 (FIG. 3A) of the hub, to allow for the second end of the hub body to expand sufficiently, in response to operational rotation of the flywheel rotor assembly, for maintaining engagement with the inside diameter of the rim. Applicants appreciate that these considerations may be at odds with one another, at least for the reason that reduced radial stiffness may tend to render the overall structure to be less rigid, and to cause at least some corresponding reduction in bending stiffness. Accordingly, it is challenging to develop a composite hub, having the overall shape illustrated in FIG. 3A, for satisfying both of these conditions in view of such competing interests.

Attention is now turned to FIG. 4 which is a diagrammatic perspective view, from a viewpoint that has been selected for illustrating further details with respect to the overall shape of one embodiment of multilayer composite hub 174. First end 176 may be configured as a shaft engaging portion 200 of the hub, defining a first length $L_1$, along the hub length L, and defining an inside diameter $D_1$ for engaging the shaft. Second end 186 may be configured as a rim engaging portion 202 of the hub, defining second length $L_2$ with an outside diameter D2 for engaging the inside diameter 190 of rim 192 (FIG. 3A). The hub may further include a transition portion 204 extending outward from the first end transverse to axis of rotation 163 to the hub engaging portion so as to form an intermediate length along the hub length L, between the first length $L_1$ and the second length $L_2$.

Attention is now directed to FIGS. 5A and 5B. FIG. 5A is a diagrammatic cross sectional view of hub 174, in elevation, illustrating further details with respect to one embodiment thereof. FIG. 5B illustrates a further enlarged view 216 of the portion of FIG. 5A shown within a dashed circle. Multilayer composite hub 174 includes a hub body 206 including a first (inner) layer 208 and a second (outer) layer 210. Inner layer 208 may be a composite layer including first fibers (not shown) supported in a first matrix (not shown), such that the first fibers form a majority of any fibers that make up the first layer. The first fibers, in the first layer, may be limited to one fiber orientation 212, as indicated in FIG. 5A by a double headed arrow, at least generally along axis of rotation 163. Of course, the specific orientation of each fiber can vary at least within a manufacturing tolerance range. Outer layer 206 may be a different composite layer including second fibers (not shown) supported in a second matrix (not shown) such that the second fibers form a majority of any fibers that make up the second layer. The second fibers may be limited to a second fiber orientation 214 that is transverse to the axis of rotation such that the fibers in the plane of the figure are arranged in an orientation that is perpendicular to the plane of the figure, as indicated in FIG. 5A by a point. Based on well established terms of art, the second fibers, in the perpendicular orientation, can be described as being arranged in a hoop orientation and the first fibers may be considered as being arranged in an axial orientation. In the instance of a hoop orientation, or any other particular intended orientation of each fiber, the specific orientation of each fiber can vary at least within a manufacturing tolerance range. As will be described in greater detail at appropriate points hereinafter, the first and second matrices, surrounding the first and second fibers, may be composed of a polymeric compound such as polyurethane and/or epoxy.

Returning to FIG. 4, it is noted that there is no requirement that the orientation of the first fibers should be limited solely to the axial direction along the entire length of each fiber. At least a subset of the first fibers may be configured in orientations such that at least a portion of each fiber in the subset includes a substantial projection along the axial direction. For purposes of illustrative clarity, two selected axially oriented fibers 215 and 215' are shown in FIG. 4 at two different portions of the hub. In addition, two fibers 217 and 217' are each tilted at an angle φ relative to the respective axial orientations of fibers 215 and 215'. In particular, at a location 219, fiber 217 is tilted at angle φ relative to fiber 215, and may be regarded as having a substantial projection onto the axial orientation that is associated with location 219. Similarly, at a location 219', fiber 217' is tilted at angle φ relative to fiber 215', and may be regarded as having a substantial projection onto the axial orientation that is associated with location 219'. Insofar as each one of a subset of the first fibers may be oriented in a direction that has a substantial projection along the axial orientation, as illustrated with respect to fibers 217 and 217', this subset of fibers may be configured to provide at least some stiffening with respect to the bending modes of the hub. In one embodiment, a subset of the first fibers may be arranged with at least a portion of each fiber in the subset tilted at a forty five degree angle with respect to the axial orientation. In another embodiment, the first fibers may be arranged with at least a portion of each fiber in the subset oriented at an angle φ in a range from zero degrees to forty five degrees with respect to the axial orientation associated with that portion. In yet another embodiment, a first subset of the first fibers may be oriented at a first angle φ, in a range from zero degrees to forty five degrees with respect to the axial orientation, and a second subset of the first fibers may be oriented at a second angle, in the range from zero degrees to forty five degrees with respect to the axial orientation. Applicants consider that the teachings disclosed herein, at least with respect to stiffening the bending modes of hub 174, are to be considered as being generally applicable with respect to any subset of the first fibers that include a substantial projection along the axial direction.

Returning to FIG. 5A, Applicants recognize, based at least in part on well known principles of composite engineering, that in the context of the overall shape of hub 174, the axial orientation of the first layer of fibers may cause the first fibers to contribute substantially to bending mode stiffness while contributing comparatively little to radial stiffness. Conversely, while the fibers in the second layer may contribute little towards the bending stiffness of the hub, Applicants recognize that the hoop orientation, of the second layer of fibers, may contribute substantially to radial stiffness of the hub, as a resistance to expansion in an outward radial direction, since expansion of the hub tends to cause tension in any fibers that are disposed in a hoop orientation. As described previously, with reference to FIG. 3A in the context of the hub as a whole, the radial stiffness of the hub body may vary along the length of the hub body, and the first and second layers may be configured to cooperate with one another such that the second end of the hub body expands sufficiently, responsive to operational rotation of the flywheel rotor assembly, for maintaining engagement with the inside diameter of the rim, at least up to and including a predetermined maximum rotational speed of the rotor assembly. Furthermore, the second fibers may be arranged such that the resistance thereof to expansion substantially exceeds the resistance to expansion due to the first fibers, and the second layer may therefore radially support and/or contain the first layer such that the first layer radially expands, responsive to operational rotation, less than it otherwise would without the presence of the second layer. In terms of descriptive nomenclature, the second layer may be regarded as providing greater hoop strength as compared to the first layer, whereas the second layer may provide sufficient hoop strength to support an embodiment of the first layer that may otherwise destructively de-laminate, at high rotational speeds, without the second layer in place. On the other hand, Applicants recognize that in an absence of the first layer, the bending stiffness of the hub, at least with respect to deformations that are associated with the second order bending mode, may be insufficient for maintaining a sufficiently high second order bending mode frequency. For example, in the absence of the first layer, the bending mode frequency of the hub body may serve as the predominant consideration in determining the maximum rotor speed. Conversely, with the first layer in place as described above, the second order bending mode frequency may substantially exceed a maximum speed that is established by one or more of a number of other factors including but not limited to a maximum rim speed and/or a speed at which the rim separates from the hub.

It is noted that composite hub 174 may be configured to exhibit substantially higher radial expansion, of the rim engaging section, as compared to conventional metal flywheel hubs. Accordingly, composite hub 174 can be configured to remain engaged with a given rim at substantially higher rotational speeds as compared to a conventional metal hub. At least for this reason, a flywheel rotor assembly that includes composite hub 174 may be configured to store substantially more rotational energy as compared with a flywheel system that utilizes a metal hub. However, as described above, Applicants recognize that configuring hub 174 for high radial expansion, at the rim engaging section, may tend to lower the frequency associated with one or more selected bending modes, as described above, and may therefore tend to exacerbate the challenges associated with these bending modes of the flywheel rotor assembly. While the first layer utilizes axial fibers for increasing the bending mode frequency, it is recognized that in the context of a particularly high speed embodiment and/or for use with a particularly high growth rim, the hub body may nevertheless provide insufficient radial stiffness for meeting predetermined design goals, relating to a required maximum speed, that may be required for a given application. In particular, the second layer, having second fibers in a hoop orientation, for enhancing radial stiffness of the hub, may nevertheless provide insufficient radial stiffness, for maintaining engagement between outside shaft diameter and the inner diameter of the hub, up to and including the required maximum speed. In order to address these challenges, a number of additional features will be brought to light immediately hereinafter.

With ongoing reference to FIG. 5B which illustrates a further enlarged view 216 of the portion of FIG. 5A is shown within a dashed circle, including a stiffening arrangement 218 that may be configured to address the challenges set forth immediately above. Stiffening arrangement 218 substantially overlays the first length $L_1$ of the shaft engaging portion of the hub. As seen, the stiffening arrangement can be coincident in length with a peripheral edge of the hub at the shaft engaging end thereof. Further, the stiffening arrangement extends in the lengthwise direction of the hub, towards the opposing rim engaging end, such that the stiffening arrangement also overlays an intermediate length $L_3$ of the transition portion nearest the shaft engaging portion. The stiffening arrangement provides an additional radial stiffness that may be customized to decrease in a stepwise manner, as will be described at appropriate points hereinafter, such that the additional radial stiffness further increases the second order bending mode frequency. In other words, the additional radial stiffness may provide an additional contribution to the bending stiffness of the hub, at least with respect to deformations associated with the second order bending mode thereof. Summarizing with respect to the foregoing points, the stiffening arrangement may be regarded as providing a dual stiffening action, at least insofar as the stiffening arrangement contributes to (i) radial stiffness of the shaft engaging portion of the hub well as (ii) bending stiffness with respect to deformations associated with the second order bending mode of the hub.

It is noted that a given hub body may be configured such that the radial stiffness of the shaft engaging portion, without the stiffening arrangement, is insufficient to maintain engagement between the inside diameter of the hub and the outside shaft diameter, at least at and/or near the maximum operational rotational speed of the rotor assembly. In this case, the additional radial stiffness, provided by the stiffening arrangement, may enhance the radial stiffness of the shaft engaging portion of the hub to a degree that is sufficient to maintain engagement between the inside diameter of the hub and the outside shaft diameter, at least up to and including the maximum operational speed.

Attention is now turned to FIG. 6 which is a diagrammatic magnified cutaway view, in elevation, illustrating the stiffening arrangement at least generally corresponding to the detailed view of FIG. 5B, presented here to provide still further illustrative clarity with respect to a number features and aspects of stiffening arrangement 218. Stiffening arrangement 218 may include a first additional layer 220 applied to hub body 206 to annularly surround (i) shaft engaging portion 200 and (ii) intermediate length $L_3$ of the transition portion of the hub. First additional layer 220 includes a first additional layer edge 222 that faces in a direction that is towards the rim engaging portion of the hub.

Stiffening arrangement 218 may further include a second additional layer 224, annularly surrounding at least a portion of first additional layer 220, including a second additional layer edge 228 facing toward the rim engaging portion of the hub. Second additional layer edge 228 is inset from the first additional layer edge 222 in an opposing direction that is away from the rim engaging portion of the hub, shown as a second layer inset 230 depicted by an arrow having a length corresponding to the amount of inset.

The stiffening arrangement may yet further include a third additional layer 232, annularly surrounding at least a portion of the second additional layer, including a third additional layer edge 236 facing towards the rim engaging portion such that the third additional layer edge is inset from the second additional layer edge to further compensate for additional stress, as will be described immediately hereinafter. The third additional layer edge is inset from the second additional layer edge in the opposing direction, shown as third layer inset 235 depicted using an arrow having a length corresponding to the amount of inset of the third edge with respect to the second edge.

The hub body, at the shaft engaging portion thereof, defines a first entrance opening 238 (FIG. 5A). The stiffening arrangement defines (i) a first stiffening arrangement end 240 (FIG. 6), nearest the first entrance opening, (ii) a second stiffening arrangement end 242, nearest the rim engaging portion off the hub, and (iii) a stiffening arrangement length $L_S$ therebetween. As will be described immediately hereinafter, the stiffening arrangement may induce an additional stress pattern 244 in the hub body responsive to the addition radial stiffness, provided by the stiffening arrangement, as the hub body biases against the stiffening arrangement with centrifugal bias force during operational rotation.

FIG. 6 includes a graph 246 rotated counter-clockwise by ninety degrees and aligned horizontally with respect to the shaft engaging portion of the hub, such that a vertical axis 248 serves as an abscissa and corresponds to positions along the length of shaft engaging portion 200 of the hub body, with each position along axis 248 representing a hub location that is horizontally aligned therewith, as indicated by horizontal dashed lines. Graph 246 further includes a horizontal axis 250, serving as an ordinate axis representing stress, as an internal force per unit area that may present in the hub body The graph may be interpreted as plotting additional stress pattern 244, as internal forces that may be oriented lengthwise, in a direction 251 along a notional internal surface 252 (shown as a dashed line) that is defined as being at least generally coextensive with surface 254 of the hub body and displaced therefrom by a distance δ. This internal force may arise as a tensile force that is responsive to a hub deflection 255 as an outward pivoting motion, relative to a knee location 257. Hub deflection is caused by a tendency of expansion of the hub body in part due to centrifugal forces 256a, 256b, 256c, and 256d that arise from operational rotation of the hub. It is noted that the deflection is shown in one location to the left of the axis of rotation in the view of the figure for purposes of illustrative clarity, but is understood to be present throughout the annular configuration of the illustrated portion of the hub, and varies along the length of the hub. Accordingly, additional stress pattern 244 is understood to be present throughout the annular configuration. Furthermore, while the reference numbers 256a, 256b, 256c, and 256d each correspond to centrifugal force at specific lengthwise portions of the hub body, it is noted that the reference number 256 may be used hereinafter to refer in a general sense to the aforedescribed external force.

While centrifugal bias force 256 is represented in FIG. 6 as discrete force vectors 256a, 256b, 256c, and 256d, for purposes of illustrative clarity, it is to be understood that these vectors may be interpreted as individual forces that are part of a distribution of forces. Centrifugal bias force 256 may vary along the length of the hub body, as indicated in FIG. 6 by differing lengths associated with the force vectors, having the length of the vector arrows representative of or at least approximately proportional to the centrifugal bias force at that position in the hub that corresponding to location of the base of each arrow.

Graph 246 is included for exemplary purposes of completeness, in order to enhance the readers understanding, and is not intended as being representative of accurate and/or quantitative estimates and/or determinations of stress with respect to any particular embodiment, nor is the graph intended as being limiting in any sense. The force vectors are presented herein in the same light and are not intended as accurate representations with respect to centrifugal force. However, Applicants consider that a person of ordinary skill in the art, familiar with well established principles and techniques of stress analysis, in the context of various embodiments a number of which will be presented at hereinafter, will be readily able to quantitatively analyze the centrifugal forces and the additional stress pattern 244 arising therefrom, having this overall disclosure in hand.

It is noted that the first additional layer may be configured to exhibit sufficient radial stiffness to substantially resist deflection 255 such that the additional stress pattern tends to concentrate at region 262 corresponding to first additional layer edge 236 and delimited by a dashed line in FIG. 6. Based at least on the above descriptions, in conjunction with well known principles of stress analysis, this concentration can be expected to produce a peak 262' in additional stress pattern 244, as indicated in graph 246. It will be appreciated by a person of ordinary skill in the art that the presence of a discontinuity, such as first additional layer edge 222, in a mechanically strained material, commonly leads to substantial concentration of stress. Applicants have verified the immediately aforedescribed concentration in the context of region 262 using commercially available ANSYS® software for analyzing stress concentrations in region 262 for a variety of embodiments, some of which will be described in greater detail hereinafter.

Similarly, the presence of second additional layer edge 228 can be expected to cause stress concentration in region 264, as indicated by peak 264' in graph 244 of the additional stress pattern, and the presence of third additional layer edge 236 can be expected to cause stress concentration in region 266, as indicated by peak 266' in graph 244.

Applicants appreciate that insets 230 and 235 may be configured for customizing the additional stress pattern for avoiding excessive stress concentrations in hub body, for example in view of a particular application. In one embodiment, second layer inset 230 may provide for redistribution, along the axial stiffening arrangement length, of the additional stress in the hub body to compensate for the additional stress. As one non-limiting example, the second additional layer may be sufficiently inset to reduce stress concentration 262', in concentration region 262, at least as compared to the stress that would otherwise be present if second layer inset 230 were eliminated such that the second additional layer entirely overlayed the entire first additional layer. In other words, the second additional layer is configured to reduce the amount of additional stress in the hub body at the first additional layer edge, to a modified stress value 262' that is less than an unmodified stress value 268 that would otherwise be present in the hub body at the first additional layer edge by having the second additional layer axially coextensive with the first additional layer. It is noted that in an absence of the aforedescribed insets, unmodified stress 268 may exceed the tensile strength of the second matrix (for example, epoxy and/or polyurethane) surrounding the fibers in second layer 210, causing mechanical failure, at least in second layer 210, wherein the fibers in second layer 210 delaminate from one another. It is noted that the second layer edge may expose the first additional layer edge to a redistributed portion of additional stress proximate to the second additional layer edge, in a stress region 270, and that the second additional layer may be advantageously configured for avoiding excessive stress with respect to this redistributed portion, and to correspondingly avoid delaminating of fibers therein.

It is noted that the third additional layer may be configured, with third additional layer edge 236 having third layer inset 235, to further compensate for the additional stress in a manner that is consistent with the immediately foregoing descriptions.

While the stiffening arrangement illustrated in FIG. 6 includes three additional layers, the descriptions are in no way intended as being limited in this regard, and it is recognized that stiffening arrangements may be configured, in accordance with the overall descriptions herein, with more or less layers. In general, the stiffening arrangement includes a series of at least two additional layers with each additional layer cooperating with an underlying supporting layer to form one step of an annular upstepped configuration on one end of the stiffening arrangement facing towards the rim engaging portion and which annular upstepped configuration leads in a direction away from the rim engaging portion.

Figure 7:
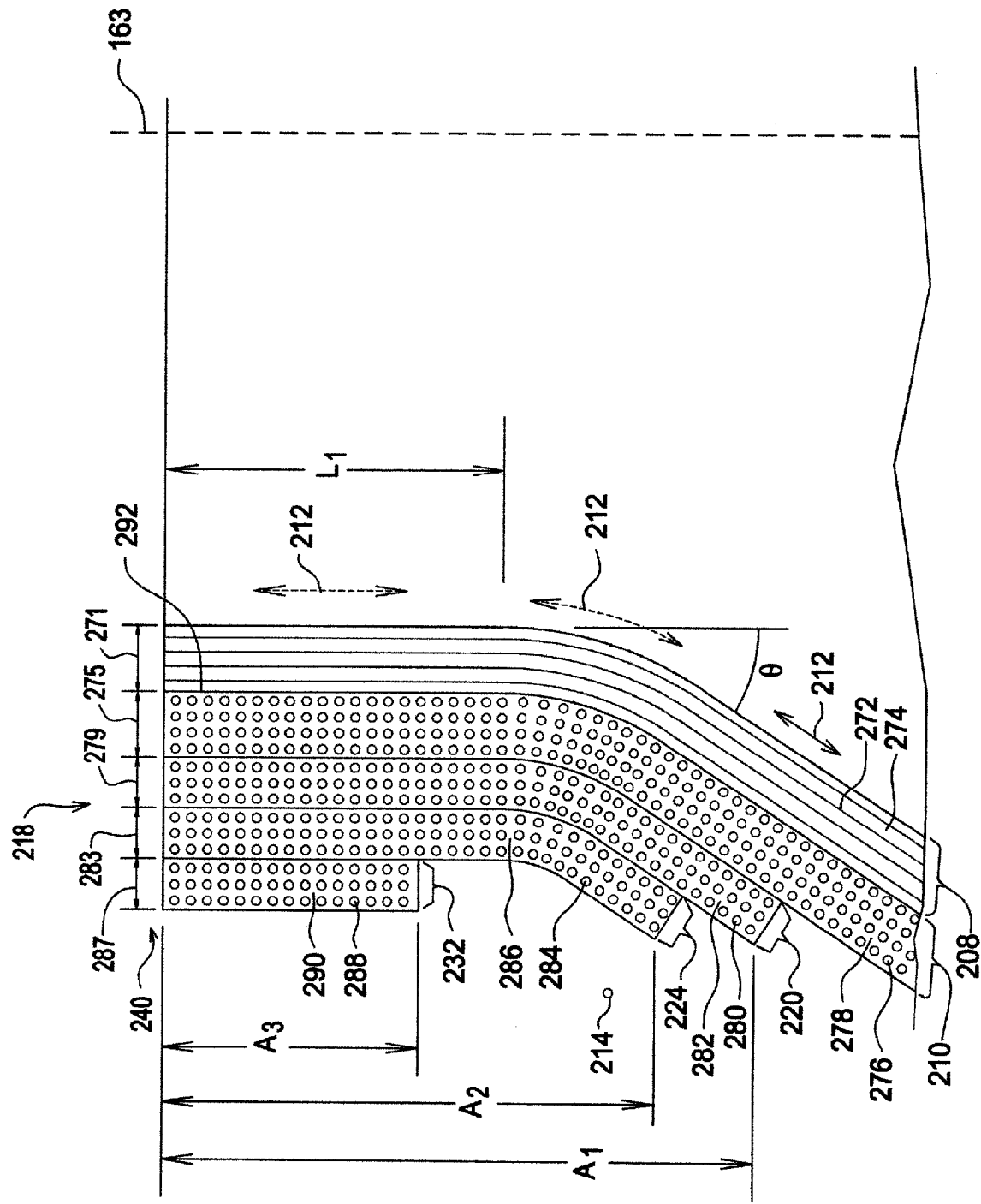
FIG. 7 is another enlarged diagrammatic cross-sectional view of the stiffening arrangement, taken from the same viewpoint as FIG. 6, shown here for illustrating yet further details with respect to its structure.

Attention is now directed to FIG. 7, which is a diagrammatic cutaway magnified view, in elevation, taken from the same view point as FIG. 6, shown here for illustrating still further details with respect to one embodiment of hub 174 including stiffening arrangement 218.

First (inner) layer 208 (See also FIG. 5A) may be a composite layer, defining a thickness 271, composed of first fibers 272 oriented along axial direction 212 that can vary in its orientation in the plane of FIG. 7 and along the vertical length of the hub. The fiber orientation of each one of the first fibers is coplanar within a particular fiber plane that also contains axis of rotation 163 of the hub. Stated in a different way, each of the second fibers can be viewed in elevation so as to project onto the axis of rotation at least within some manufacturing tolerance. Accordingly several other axial orientations are shown in phantom using dashed arrows. The first fibers may be supported by a first matrix 274 (for example a polyurethane and/or an epoxy compound). The first fibers are depicted in FIG. 7 as being spaced apart from one another by gaps that are highly exaggerated for purposes of illustrative clarity.

Second (outer) layer 210 may be a composite layer, defining a second layer thickness 275, composed of second fibers 276 oriented in second orientation 214 that is transverse to the axis of rotation such that the second fibers are arranged in an orientation that is perpendicular to the plane of the figure. The second fibers may be supported by a second matrix 278 (for example a polyurethane and/or an epoxy compound). The second fibers are depicted in FIG. 7 as being spaced apart from one another by gaps that are highly exaggerated in the figure. It is noted that for purposes of consistency, FIG. 7 illustrates exaggerated fiber spacing for all the composite layers shown therein. As previously described with reference to FIG. 5A, the second fibers, in the perpendicular orientation, can be considered as being arranged in a hoop orientation and the first fibers may be considered as being arranged in an axial orientation.

With respect to stiffening arrangement 218, the first second and third layers may all be composite materials. First additional layer 220 may define a first additional layer thickness 279 that is made up of first additional fibers 280 that are oriented in the hoop orientation and supported by a first additional matrix 282. Second additional layer 224 of the stiffening arrangement may define a second additional layer thickness 283 of second additional fibers 284 that are oriented in the hoop orientation and supported by a first additional matrix 286. Third additional layer 232 of the stiffening arrangement may define yet a third additional layer thickness 287 of third additional fibers 288 that are oriented in the hoop orientation and supported by a third additional matrix 290.

With ongoing reference to FIG. 7, in conjunction with FIG. 4, and by way of non-limiting example, the composite hub may be configured such that inner diameter $D_1$ (FIG. 4), of the shaft engaging portion of the hub, is approximately 15.78 inches. Outside diameter $D_2$ (FIG. 4), of the rim engaging portion of the hub may be approximately 21.1 inches. Hub length L (FIG. 4) may be approximately 6.23 inches, and length $L_1$ of the shaft engaging portion may be approximately 0.75 inches. A cone angle θ of transition portion 204 (FIG. 4) of the hub may be approximately 30 degrees. A length $A_1$, representing the vertical extents of the first additional layer, from first stiffening arrangement end 240 towards the rim engaging end, in terms of a projection along the direction of axis of rotation 163, may be approximately 1.338 inches. A length $A_2$, representing the vertical extents of the second additional layer, from first stiffening arrangement end 240 towards the rim engaging end, in terms of a projection along the direction of axis of rotation 163, may be approximately 1.12 inches. A length $A_3$ of the third additional layer may be approximately 0.585 inches. It should be appreciated that these specific dimensions and orientations may be modified in an essentially unlimited variety of ways by a person of ordinary skill in the art having this overall disclosure in hand and while remaining within the scope of the teachings that have been brought to light herein.

The following table specifies thickness and composition of each layer of the embodiment at hand. The upper row of Table 1 designates column headings for a number of different characteristics of each layer, including layer thickness, fiber type, and the matrix by which the fibers are supported. The leftmost column of Table 1 includes a listing of all the aforedescribed layers associated with the present embodiment, and a second column of entries in Table 1 provides the reference number associated with each layer. The third column lists the approximate thickness of each layer, and the fourth column lists the fibers used in each layer. It is noted that for selected table entries in the FIBER column, corresponding to the additional layers, two fibers are listed in each table entry. In these additional layers, the fibers listed in parenthesis may be substituted in place of the first listed fiber for each table entry. Any suitable fiber or combination of fibers either currently available or yet to be developed may be used. In addition, for each layer of the hub, the matrix for supporting the fiber therein is listed in the MATRIX (right most) column of Table 2. In all cases the matrix may be a selected one of (i) a widely available high strength epoxy, such as a two part thermoset resin, and (ii) a polyurethane that is characterized, for example, by a modulus in a range from 30 to 50 ksi, and by a tensile strength of at least 4 ksi. A person who is well versed in composite engineering may select the epoxy from amongst a variety of well known commercially available epoxies that are suitable, in composite applications, for use with the fibers described herein (Torray® T1000G and/or Hexcel® IM9). Moreover, the present disclosure is equally applicable with respect to any suitable matrix materials currently available or yet to be developed. Furthermore, it is noted that first (inner) layer 208 and second (outer) layer 210 of the hub body may be bonded with one another along a bond 292 disposed therebetween. This bond may be provided, based on well known techniques, with any suitable material such as an epoxy, and/or polyurethane.

reference to FIG. 3A, For operation at a rotational speed of 40,000 RPM, Applicants have determined by further ANSYS® analysis that the presence of the first (inner) layer of axially oriented fibers can be expected to provide for a second order bending mode frequency (at 40,000 RPM) that is approximately 15% higher than would otherwise be the case in the absence of the first (inner) layer of axially oriented fibers. In this regard it is noted that all of the bending modes increase in frequency as described above.

Returning to FIG. 4, Applicants recognize that it may be highly impractical to fabricate the first (inner) layer, and possibly other layers, of the hub body using standard filament winding techniques. Standard filament winding techniques typically rotate a composite structure while winding a fiber thereon simultaneously with application of uncured matrix compound. While these techniques are often straightforward for fabrication of composite structures having rotational and/or cylindrical symmetry, and may be suitable for producing any of the layers that include a majority of fibers in the hoop orientation, it may be highly impractical, with respect to fabrication of composite hub 174, to utilize such techniques for fabricating the first (inner) layer of axial fibers, at least since this layer may include axial fibers. Furthermore, the overall geometry of the hub may further increase the challenge associated with conventional filament winding of fibers having any substantial axial component of orientation.

State-of-the-art composite manufacturing technology is replete with fabrication techniques wherein filament winding represents one of many different general approaches for fabricating single and/or multi-layer composite structures. While the hub body embodiments described herein tend to exhibit rotational symmetry, in accordance with the annular geometries thereof, Applicants appreciate that this rotational symmetry in no way implies that the hub body, or any other features of the hub, could or should be fabricated using filament winding techniques. The first layer of the hub body, or any other layer of the embodiments described herein, may be fabricated based on a wide variety of techniques, including but not limited to lay-up techniques that are commonly employed in fabrication of composite structures having complex and/or simple shapes. As one example of a lay-up technique, a mandrel may be provided having a shape that matches an inside surface 294 of the hub body. A matrix-free sheet of fibers, including first fibers 272, may be wrapped

TABLE 1

|  | # | THICKNESS | FIBER | MATRIX |
| --- | --- | --- | --- | --- |
| First (inner) Layer | 208 | 0.04 inch | Torray ® T1000G | Epoxy or Polyurethane |
| Second (outer) Layer | 210 | 0.155 inch | Torray ® T1000G | Epoxy or Polyurethane |
| First Additional Layer | 220 | 0.1 inch | Torray ® M46J (Hexcel ® IM9) | Epoxy or Polyurethane |
| Second Additional Layer | 224 | 0.1 inch | Torray ® M46J (Hexcel ® IM9) | Epoxy or Polyurethane |
| Third Additional Layer | 232 | 0.1 inch | Torray ® M46J (Hexcel ® IM9) | Epoxy or Polyurethane |

With respect to the aforedescribed embodiment of hub 174, based at least on finite element analysis using commercially available ANSYS® software, Applicants have demonstrated that the outside diameter $D_2$, of the rim engaging portion, can be expected to exhibit a radial growth of approximately 0.12 inches at a maximum speed of approximately 40,000 RPM. Inner diameter $D_1$, of the shaft engaging portion of the hub, can be expected exhibit a radial growth of approximately 0.039 inches at this speed. In the context of one embodiment of the flywheel rotor assembly, described previously with around the mandrel and held in place while epoxy and/or polyurethane is impregnated therein. The application of uncured matrix material may be carried out manually, semi-automatically, or automatically, for example, by brushing and/or spraying, or the equivalent thereof, or impregnation of matrix material into the cloth may be performed using one of a variety of vacuum impregnating techniques, including but not limited to vacuum molding. In some applications, it may be desirable to provide the matrix-free sheet of fibers as a fabric-like weave that includes the first fibers interwoven with a comparatively small number of auxiliary fibers that may be interwoven therewith at least in order to lend to the cloth a sufficient degree of integrity such that the sheet of fibers remains substantially intact at least during delivery and handling thereof, and during application of the cloth to the mandrel or to an underlying layer of the composite structure over which the sheet has been applied. Based on well known techniques, these auxiliary fibers could be arranged as a small minority of the fibers in the sheet, and may be of different composition than the majority of fibers.

As another example of a lay-up technique, one or more layers of hub 174 may be formed from a pre-impregnated (or "pre-preg") sheet of composite fibers. These usually take the form of a weave or are uni-directional. Prior to assembly into a multilayer composite structure, single pre-preg layers generally contain an amount of matrix material used to bond them together and to other components during manufacture. The pre-pregs are often stored, prior to use in a multilayer composite structure, in cooled areas since activation is most commonly performed by the application of heat. Hence, composite structures formed of pre-impregnated fibers may often require an oven or an autoclave exposure. It is noted that heat-activated curing is in now way limited to layers formed from pre-preg sheets, and various embodiments described herein may incorporate benefit from or require heat exposure in order to facilitate proper curing of the matrix materials.

While a number of exemplary aspects and embodiments have been discussed above, those of ordinary skill in the art will recognize certain modifications thereof which are considered to be within the scope of the teachings that have been brought to light herein. For example, as described above, there is no requirement that the orientations of the first fibers should be limited solely to the axial direction. At least a subset of the first fibers may be configured in a tilted orientation such that at least a portion of each fiber in the subset includes a substantial projection along the axial orientation corresponding to that portion. As another example, while hub body 174 has been described as including two layers, Applicants recognize that hub body 174 may include additional hub body layers. Moreover, there is no requirement that the fiber orientations in a given additional hub body layer should be limited to one of an axial orientation and a hoop orientation. Applicants further recognize that the configuration of any additional hub body layer, including the fiber orientations therein, may be configured for cooperating with other layers in the hub body for customizing the characteristics of the hub at least for addressing the previously described competing interests that may arise between the radial stiffness of the shaft engaging portion of the hub and the bending mode stiffness of a predetermined bending mode frequency of the hub. As one example, Applicants are presently considering and analyzing hub configurations that include an additional intermediate hub body layer that is disposed between the first and second layers and is configured such that at least a majority of fibers therein are carbon fibers that are arranged in a orientation that is tilted at forty five degrees with respect to both of the first and second layers of the aforedescribed embodiments.

In addition to the immediately aforedescribed modifications, Applicants believe that those of ordinary skill in the art will recognize yet more modifications, permutations, additions and sub-combinations thereof. It is therefore intended that the following appended claims and claims hereafter are interpreted to include all such modifications, permutations, additions and sub-combinations as are within their true spirit and scope.

What is claimed is:

1. A hub for use in a high-speed flywheel rotor assembly as part of an overall flywheel system, the rotor assembly including a shaft that supports said hub which, in turn, supports a rim such that the rotor assembly exhibits at least one predetermined bending mode frequency, said hub comprising:

an annular hub body defining an axis of rotation and having a hub length extending along the axis of rotation from a first end to a second, opposing end, said first end defining an inside diameter for engaging an outside diameter of said shaft for co-rotation therewith and said second end defining an outside diameter for engaging an inside diameter of said rim, said annular hub body formed in a layered configuration at least including a first layer that includes at least first fibers supported in a first matrix such that the first fibers form at least a portion of the fibers that make up the first layer, and at least a portion of each one of the first fibers is aligned in a fiber orientation that defines at least a projection along an axial direction that lies within a plane, bisecting the hub and also containing the axis of rotation; and a second layer that annularly surrounds the first layer and which includes at least second fibers supported in a second matrix such that the second fibers form at least a majority of the fibers that make up the second layer and the second fibers are limited to another fiber orientation that is transverse to the axis of rotation, wherein said first layer and said second layer exhibit a first radial stiffness and a second radial stiffness, respectively, as a resistance to expansion in a radial direction responsive to a rotation of said rotor assembly, and the first and second layers are configured to cooperate with one another so that said hub body exhibits a radial hub body stiffness that varies along the length of said hub body such that said second end of said hub body expands, responsive to said operational rotation, for maintaining said engagement with said inside diameter of said rim, at least up to and including a predetermined maximum rotational speed of said rotor assembly.

2. The hub of claim 1 wherein said portion of the first fibers is a majority of the fibers that make up the first layer.

3. The hub of claim 1 wherein said portion of each one of the first fibers extends along a majority of the hub length.

4. A hub for use in a high-speed flywheel rotor assembly as part of an overall flywheel system, the rotor assembly including a shaft that supports said hub which, in turn, supports a rim such that the rotor assembly exhibits at least one predetermined bending mode frequency, said hub comprising:

an annular hub body defining an axis of rotation and having a hub length extending along the axis of rotation from a first end to a second, opposing end, said first end defining an inside diameter for engaging an outside diameter of said shaft for co-rotation therewith and said second end defining an outside diameter for engaging an inside diameter of said rim, said annular hub body formed in a layered configuration at least including a first layer that includes at least first fibers supported in a first matrix such that the first fibers form at least a majority of the fibers that make up the first layer and the first fibers are limited to one fiber orientation along the axis of rotation and a second layer that annularly surrounds the first layer and which includes at least second fibers supported in a second matrix such that the second fibers form at least a majority of the fibers that make up the second layer and the second fibers are limited to another fiber orientation that is transverse to the axis of rotation, wherein said first layer and said second layer exhibit a first radial stiffness and a second radial stiffness, respectively, as a resistance to expansion in a radial direction responsive to a rotation of said rotor assembly, and the first and second layers are configured to cooperate with one another so that said hub body exhibits a radial hub body stiffness that varies along the length of said hub body such that said second end of said hub body expands, responsive to said operational rotation, for maintaining said engagement with said inside diameter of said rim, at least up to and including a predetermined maximum rotational speed of said rotor assembly.

5. The hub of claim 4 wherein the second layer is bonded directly to the first layer.

6. The hub of claim 4 wherein the fiber orientation of each one of the first fibers is coplanar within a particular fiber plane that also contains the axis of rotation.

7. The hub of claim 4 wherein said second fibers are arranged in a hoop orientation such that a first resistance to expansion of the first layer is less than a second resistance to expansion of the second layer, so that the second layer at least radially supports and contains the first layer such that said first layer expands less than it otherwise would without the second layer during said operational rotation.

8. The hub of claim 4 wherein said first end of the hub body serves as a shaft engaging portion that is configured for engaging the outside diameter of the shaft for co-rotation with the shaft and forming a first length along said hub length having said inside diameter for engaging the shaft and said second end of the hub body serves as a rim engaging portion having a second length along the hub length configured with said outside diameter for engaging the inside diameter of the rim and the hub body further includes a transition portion extending outward from the shaft engaging portion transverse to the axis of rotation to the rim engaging portion so as to form an intermediate length along the hub length between said first length and said second length.

9. The hub of claim 8, further comprising:
a stiffening arrangement (i) substantially overlaying said first length of the shaft engaging portion and (ii) a part of the intermediate length of the transition portion nearest the shaft engaging portion to provide an additional radial stiffness at the shaft engaging portion that decreases in a stepwise manner toward the rim engaging portion such that the additional radial stiffness further increases the predetermined bending mode frequency and the shaft engaging portion of the hub body maintains co-rotation with the shaft during the rotation of said rotor assembly.

10. The hub of claim 9 wherein said additional radial stiffness provided by the stiffening arrangement enhances the radial stiffness of said shaft engaging portion to a degree that is sufficient to maintain said engagement between said inside diameter of said hub and said outside diameter of said shaft, at least up to and including said predetermined maximum rotational speed of said rotor assembly.

11. The hub of claim 9 wherein said hub body is configured such that said radial stiffness of said shaft engaging portion, without said stiffening arrangement, is insufficient to maintain said engagement between said inside diameter of said hub and said outside diameter of said shaft at least at the predetermined maximum rotational speed of said rotor assembly.

12. The hub of claim 9 wherein the hub body at the shaft engaging portion defines a first entrance opening and the stiffening arrangement includes a first stiffening arrangement end nearest the first entrance opening and a second stiffening arrangement end nearest the rim engaging portion and having a stiffening arrangement length therebetween such that the stiffening arrangement induces an additional stress pattern in the hub body responsive to the additional radial stiffness as the hub body biases with centrifugal force against the stiffening arrangement during said operational rotation and the additional stress pattern, starting from the first stiffening arrangement end and extending to the second stiffening arrangement end, exhibits a series of stepwise decreasing values.

13. The hub of claim 12 wherein the stiffening arrangement is an annular layered composite structure.

14. The hub of claim 9 wherein the stiffening arrangement is an annular layered structure having an axial stiffening arrangement length along said axis of rotation that induces an additional stress in said hub body responsive to the operational rotation and said stiffening arrangement further comprises:
a first additional layer applied to the hub body to annularly surround the shaft engaging portion and a part of the intermediate length of the transition portion to form said axial stiffening arrangement length along the axis of rotation having a first additional layer edge that faces in a direction that is toward the rim engaging portion; and
at least a second additional layer annularly surrounding at least a portion of the first additional layer having a second additional layer edge facing toward the rim engaging portion with the second additional layer edge inset from the first additional layer edge in an opposing direction that is opposite the rim engaging portion such that the second additional layer causes a redistribution of the additional stress in the hub body along the axial stiffening arrangement length to compensate for the additional stress.

15. The hub of claim 14 wherein the second additional layer is configured to reduce an amount of the additional stress in the hub body at the first additional layer edge to a modified stress value that is less than an unmodified stress value that would otherwise be present in the hub body at the first additional layer edge by having the second additional layer axially co-extensive with the first additional layer.

16. The hub of claim 14 wherein said second additional layer is configured to expose the first additional layer to a redistributed portion of the additional stress proximate to the second additional layer edge.

17. The hub of claim 14, further comprising:
at least a third additional layer annularly surrounding at least a portion of the second additional layer having a third additional layer edge facing in the rim engaging portion direction toward the rim engaging portion such that said third additional layer edge is inset from the second additional layer edge in said opposing direction to further compensate for the additional stress.

18. The hub of claim 9 wherein the stiffening arrangement includes a series of at least two additional layers with each additional layer cooperating with an underlying supporting layer to form one step of an annular up stepped configuration on one end of the stiffening arrangement facing towards the rim engaging portion and which the annular upstepped configuration leads in a direction away from the rim engaging portion.

19. A system including a high-speed flywheel rotor assembly as part of an overall flywheel system, the rotor assembly including a shaft that supports a hub which, in turn, supports a rim such that the rotor assembly exhibits a predetermined bending mode frequency, and said rim exhibits a radial rim stiffness as a resistance to expansion in a radial direction responsive to centrifugal force induced by an operational rotation of the rotor assembly, an improvement comprising:

said hub including an annular elongated hub body in a layered configuration at least including a first material layer that consists of fibers supported in a first matrix having a majority of the fibers limited to a fiber orientation extending along an axis of rotation, wherein the annular elongated hub body comprises a second material layer that annularly surrounds the first material layer, wherein said first material layer and said second material layer exhibit a first radial stiffness and a second radial stiffness, respectively, as a resistance to expansion in a radial direction responsive to a rotation of said rotor assembly, and the first material layer and second material layer are configured to cooperate with one another so that said hub body exhibits a radial hub body stiffness that varies along the length of said hub body such that said second end of said hub body expands, responsive to said operational rotation, for maintaining said engagement with said inside diameter of said rim, at least up to and including a predetermined maximum rotational speed of said rotor assembly.

20. A method for producing a hub for use in a high-speed flywheel rotor assembly as part of an overall flywheel system, the rotor assembly including a shaft that supports said hub which, in turn, supports a rim such that the rotor assembly exhibits a predetermined bending mode frequency, and said rim exhibits a radial rim stiffness as a resistance to expansion in a radial direction responsive to centrifugal force induced by an operational rotation of the rotor assembly, said method comprising:

forming an annular elongated hub body at least including a first layer that includes at least first fibers supported in a first matrix with the first fibers forming at least a majority of the fibers that make up the first layer and orienting the first fibers limited to one fiber orientation along an axis of rotation and annularly surrounding the first layer with a second layer, the second layer includes at least second fibers supported in a second matrix with the second fibers forming at least a majority of the fibers that make up the second layer and orienting the second fibers limited to another fiber orientation that is transverse to the axis of rotation such that the hub body is formed to define the axis of rotation and having a hub length extending along the axis of rotation from a first end to a second, opposing end; and defining an inside diameter at said first end for receiving said shaft for co-rotation therewith and an outside diameter at said second end for engaging an inside diameter of said rim, wherein said first layer and said second layer exhibit a first radial stiffness and a second radial stiffness, respectively, as a resistance to expansion in a radial direction responsive to a rotation of said rotor assembly, and the first and second layers are configured to cooperate with one another so that said hub body exhibits a radial hub body stiffness that varies along the length of said hub body such that said second end of said hub body expands, responsive to said operational rotation, for maintaining said engagement with said inside diameter of said rim, at least up to and including a predetermined maximum rotational speed of said rotor assembly.

21. The method of claim 20 including applying said first fibers in a hand layup technique as part of producing the hub.

22. A In a method for producing a hub for use in a high-speed flywheel rotor assembly as part of an overall flywheel system, the rotor assembly including a shaft that supports said hub which, in turn, supports a rim such that the rotor assembly exhibits a predetermined bending mode frequency, and said rim exhibits a radial rim stiffness as a resistance to expansion in a radial direction responsive to centrifugal force induced by an operational rotation of the rotor assembly, an improvement comprising:

forming an annular elongated hub body in a layered configuration at least including a first material layer that consists of fibers supported in a first matrix having a majority of the fibers limited to a fiber orientation extending along an axis of rotation, wherein the annular elongated hub body comprises a second material layer that annularly surrounds the first material layer, wherein said first material layer and said second material layer exhibit a first radial stiffness and a second radial stiffness, respectively, as a resistance to expansion in a radial direction responsive to a rotation of said rotor assembly, and the first material layer and second material layer are configured to cooperate with one another so that said hub body exhibits a radial hub body stiffness that varies along the length of said hub body such that said second end of said hub body expands, responsive to said operational rotation, for maintaining said engagement with said inside diameter of said rim, at least up to and including a predetermined maximum rotational speed of said rotor assembly.

23. The method of claim 22 including applying said fibers in a hand layup technique as part of producing the hub.

* * * * *